(12) United States Patent
Banning et al.

(10) Patent No.: US 7,381,255 B2
(45) Date of Patent: Jun. 3, 2008

(54) PHASE CHANGE INKS

(75) Inventors: Jeffrey H. Banning, Hillsboro, OR (US); Bo Wu, Wilsonville, OR (US); C Wayne Jaeger, Birkenfeld, OR (US)

(73) Assignee: Xerox Corporation, Norwalk, CT (US)

( * ) Notice: Subject to any disclaimer, the term of this patent is extended or adjusted under 35 U.S.C. 154(b) by 283 days.

(21) Appl. No.: 11/291,057

(22) Filed: Nov. 30, 2005

(65) Prior Publication Data

US 2007/0120918 A1 May 31, 2007

(51) Int. Cl.
C09D 11/02 (2006.01)
(52) U.S. Cl. .................................. 106/31.29; 106/31.48
(58) Field of Classification Search ............. 106/31.29, 106/31.61, 31.48
See application file for complete search history.

(56) References Cited

U.S. PATENT DOCUMENTS

| | | | |
|---|---|---|---|
| 3,653,932 | A | 4/1972 | Berry et al. |
| 4,390,369 | A | 6/1983 | Merritt et al. |
| 4,484,948 | A | 11/1984 | Merritt et al. |
| 4,684,956 | A | 8/1987 | Ball |
| 4,851,045 | A | 7/1989 | Taniguchi |
| 4,889,560 | A | 12/1989 | Jaeger et al. |
| 4,889,761 | A | 12/1989 | Titterington et al. |
| 5,006,170 | A | 4/1991 | Schwarz et al. |
| 5,151,120 | A | 9/1992 | You et al. |
| 5,372,852 | A | 12/1994 | Titterington et al. |
| 5,496,879 | A | 3/1996 | Griebel et al. |
| 5,621,022 | A | 4/1997 | Jaeger et al. |
| 6,147,140 | A | 11/2000 | Jaeger et al. |

FOREIGN PATENT DOCUMENTS

| | | |
|---|---|---|
| EP | 0 206 286 B1 | 5/1990 |
| EP | 0 187 352 B1 | 6/1991 |
| EP | 0519138 A2 | 12/1992 |
| WO | WO 94/04619 | 3/1994 |

OTHER PUBLICATIONS

Copending U.S. Appl. No. 11/126,745, filed May 11, 2005, entitled "Method of Purification of Polyalkylene Materials," by San-Ming Yang et al.
Copending U.S. Appl. No. 11/290,221, filed Nov. 30, 2005, entitled "Phase Change Inks," by Bo Wu et al.
Copending U.S. Appl. No. 11/291,055, filed Nov. 30, 2005, entitled "Phase Change Inks," by Bo Wu et al.
Copending U.S. Appl. No. 11/290,263, filed Nov. 30, 2005, entitled "Phase Change Inks," by Bo Wu et al.
Copending U.S. Appl. No. 11/291,056, filed Nov. 30, 2005, entitled "Colorant Compounds," by Jeffery H. Banning et al.
Copending U.S. Appl. No. 11/290,258, filed Nov. 30, 2005, entitled "Phase Change Inks Containing Specific Colorants," by Bo Wu et al.
Copending U.S. Appl. No. 11/290,265, filed Nov. 30, 2005, entitled "Phase Change Inks," by Trevor J. Snyder et al.
Copending U.S. Appl. No. 11/290,222, filed Nov. 30, 2005, entitled "Phase Change Inks Containing Fischer-Tropsch Waxes," by Bo Wu et al.
English abstract for German Patent Publication DE 420563AL.
English abstract for German Patent Publication DE 4205713AL.

*Primary Examiner*—J. A. Lorengo
*Assistant Examiner*—Veronica Faison-Gee
(74) *Attorney, Agent, or Firm*—Judith L. Byorick

(57) ABSTRACT

Disclosed is a phase change ink composition comprising a phase change ink carrier and a colorant compound of the formula

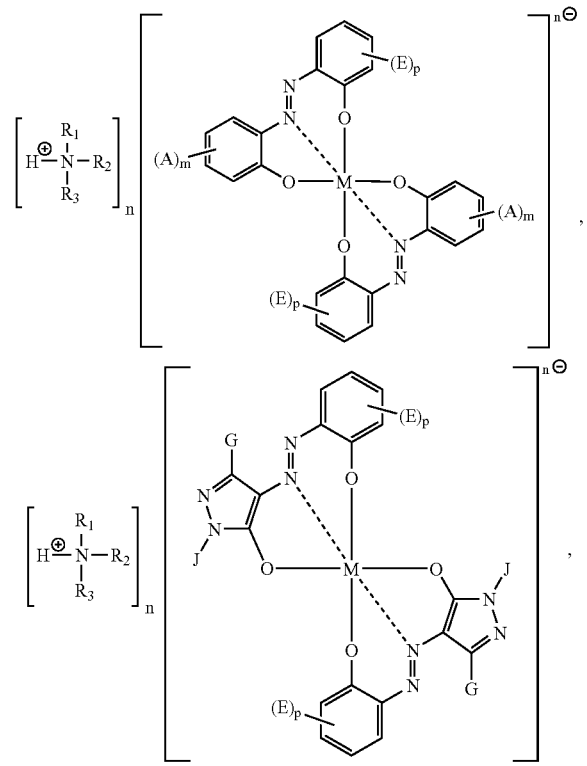

or mixtures thereof, wherein $R_1$, $R_2$, $R_3$, M, A, E, G, J, m, n, and p are as defined herein.

65 Claims, No Drawings

PHASE CHANGE INKS

CROSS-REFERENCE TO RELATED APPLICATIONS

Copending application U.S. Ser. No. 11/126,745, filed May 11, 2005, entitled "Method of Purification of Polyalkylene Materials," with the named inventors San-Ming Yang, Thomas E. Enright, Val Magdalinis, Ahmed Alzamly, Man C. Tam, Carol A. Jennings, Peter M. Kazmaier, and Marko D. Saban, the disclosure of which is totally incorporated herein by reference, discloses a method of purifying polyalkylene. Also included are microencapsulated Gyricon beads, phase change ink, and toners comprising the purified polyalkylene.

Copending application U.S. Ser. No. 11/290,221, filed concurrently herewith, entitled "Phase Change Inks," with the named inventors Bo Wu, Stephan V. Drappel, Trevor J. Snyder, Donald R. Titterington, Jule W. Thomas, Jr., C. Geoffrey Allen, Harold R. Frame, and Wolfgang G. Wedler, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end; (2) melting the ink; and (3) causing droplets of the melted ink to be ejected in an imagewise pattern onto a substrate.

Copending application U.S. Ser. No. 11/291,055, filed concurrently herewith, entitled "Phase Change Inks," with the named inventors Bo Wu, Trevor J. Snyder, Stephan V. Drappel, Jule W. Thomas, Jr., Donald R. Titterington, and C. Geoffrey Allen, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.05 to about 3.0. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.05 to about 3.0; (2) melting the ink; and (3) causing droplets of the melted ink to be ejected in an imagewise pattern onto a substrate.

Copending application U.S. Ser. No. 11/290,263, filed concurrently herewith, entitled "Phase Change Inks," with the named inventors Bo Wu, Trevor J. Snyder, Jule W. Thomas, Jr., and Patricia Ann Wang, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.0001 to about 1.500. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.0001 to about 1.500; (2) melting the ink; and (3) causing droplets of the melted ink to be ejected in an imagewise pattern onto a substrate.

Copending application U.S. Ser. No. 11/291,056, filed concurrently herewith, entitled "Colorant Compounds," with the named inventors Jeffery H. Banning, Bo Wu, and C. Wayne Jaeger, the disclosure of which is totally incorporated herein by reference, discloses colorant compounds of the formulae

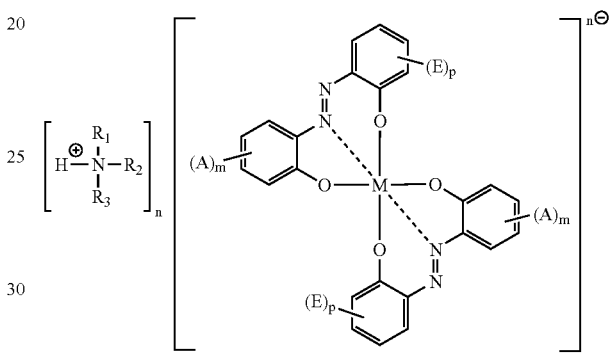

and wherein $R_1$, $R_2$, $R_3$, M, A, E, G, J, m, n, and p are as defined therein.

Copending application U.S. Ser. No. 11/290,258, filed concurrently herewith, entitled "Phase Change Inks Containing Specific Colorants," with the named inventors Bo Wu, Trevor J. Snyder, Jeffery H. Banning, and Jule W. Thomas, Jr., the disclosure of which is totally incorporated herein by reference, discloses a phase change ink composition comprising (a) a phase change ink carrier comprising (1) an amide; and (2) a polyethylene wax having an average peak molecular weight of from about 350 to about 730 and a polydispersity of from about 1.0001 to about 1.5; and (b) a colorant compound of the formula

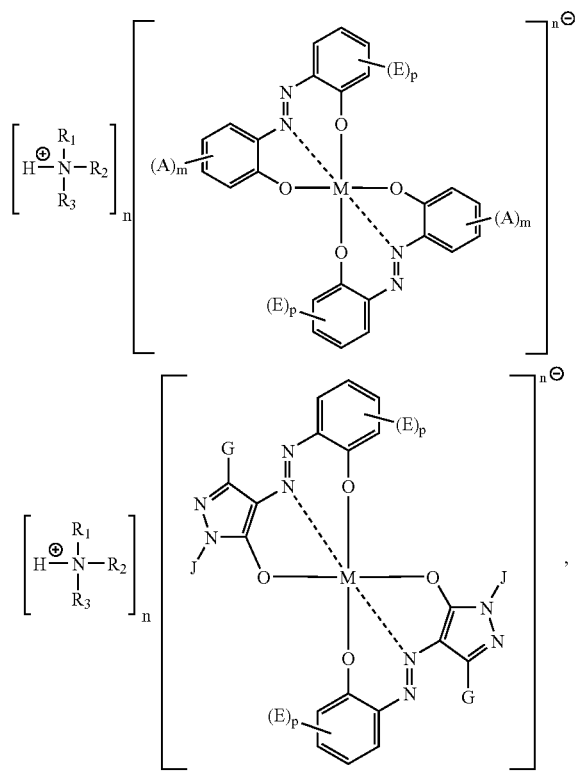

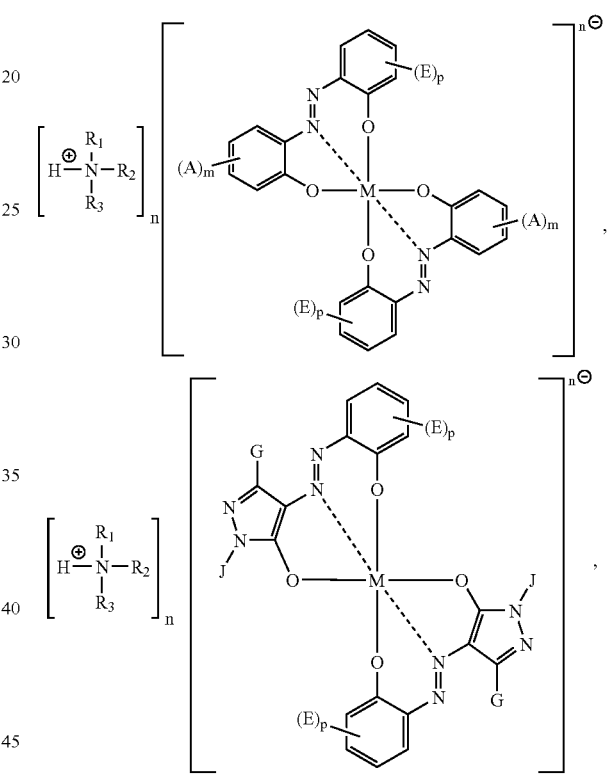

or mixtures thereof, wherein $R_1$, $R_2$, $R_3$, M, A, E, G, J, m, n, and p are as defined therein.

Copending application U.S. Ser. No. 11/290,265, filed concurrently herewith, entitled "Phase Change Inks," with the named inventors Trevor J. Snyder, Bo Wu, Patricia Ann Wang, Donald R. Titterington, Jule W. Thomas, Jr., Randall R. Bridgeman, and Mark H. Tennant, the disclosure of which is totally incorporated herein by reference, discloses a phase change ink composition comprising an ink carrier and a colorant, said ink being suitable for use in an indirect printing process wherein the ink is jetted from a printhead onto a heated intermediate transfer member and subsequently transferred from the intermediate transfer member to a final recording substrate, wherein: (a) the ink can be jetted from the printhead onto the intermediate transfer member when the ink is maintained at a temperature of about 125° C. or lower; (b) the ink can be jetted without purging from a printer maintained at a standby temperature of about 100° C. or lower; and (c) the ink has a cohesive failure temperature of at least about 54° C.

Copending application U.S. Ser. No. 11/290,222; filed concurrently herewith, entitled "Phase Change Inks Containing Fischer-Tropsch Waxes," with the named inventors Bo Wu, Patricia Ann Wang, Trevor J. Snyder, and Jule W. Thomas, Jr., the disclosure of which is totally incorporated herein by reference, discloses a phase change ink comprising (a) a colorant and (b) a phase change ink carrier, said carrier comprising (i) an amide and (ii) a Fischer-Tropsch wax having an average peak molecular weight of from about 300 to about 800 and a polydispersity of from about 1.001 to about 3. Also disclosed is a process which comprises (1) incorporating into an ink jet printing apparatus a phase change ink comprising (a) a colorant and (b) a phase change ink carrier, said carrier comprising (i) an amide and (ii) a Fischer-Tropsch wax having an average peak molecular weight of from about 300 to about 800 and a polydispersity of from about 1.001 to about 3; (2) melting the ink; and (3) causing droplets of the melted ink to be ejected in an imagewise pattern onto a substrate.

BACKGROUND

Disclosed herein are phase change ink compositions. More specifically, disclosed herein are phase change inks containing colorant compounds particularly suitable for use in hot melt or phase change inks. One embodiment is directed to a phase change ink composition comprising a phase change ink carrier and a colorant compound of the formula or mixtures thereof, wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and hetero atoms, excluding atoms in any substituents, in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,147,140 (Jaeger et al.), the disclosure of which is totally incorporated herein by reference, discloses a phase change ink composition comprising a phase change ink carrier system in combination with a compatible colorant system, the colorant system comprising a combination of (1) a black colorant having an absorbance in the 475 nanometer region which is less than 80 percent of the absorbance at the 580 nanometer region and (2) a sufficient amount of at least one own colorant having an absorbance in the 475 nanometer region whereby the colorant has a ratio of absorbance in the 475 nanometer region to the 580 nanometer region from about 0.92:1.0 to about 1.01:1.0.

While known compositions and processes are suitable for their intended purposes, a need remains for improved colorant compounds. In addition, a need remains for colorant compounds particularly suitable for use in phase change inks. Further, a need remains for colorant compounds with a desirable degree of thermal stability. Additionally, a need remains for colorant compounds that exhibit a desirable degree of solubility in vehicles employed in phase change inks. There is also a need for colorant compounds that are compatible with phase change ink vehicles capable of operating with reduced energy requirements. In addition, there is a need for colorant compounds that exhibit desirably high chroma in phase change inks. Further, there is a need for colorant compounds that exhibit satisfactory hue in phase change inks. Additionally, there is a need for colorant compounds that exhibit a high degree of lightfastness in phase change inks. A need also remains for colorant compounds that exhibit a relatively low degree of diffusion and bleeding into adjoining printed areas of different colors when incorporated into phase change inks and printed. In addition, a need remains for colorant compounds that are safe to handle. Further, a need remains for colorant compounds that enable generation of prints with reduced pile height.

SUMMARY

Disclosed herein is a phase change ink composition comprising a phase change ink carrier and a colorant compound of the formula

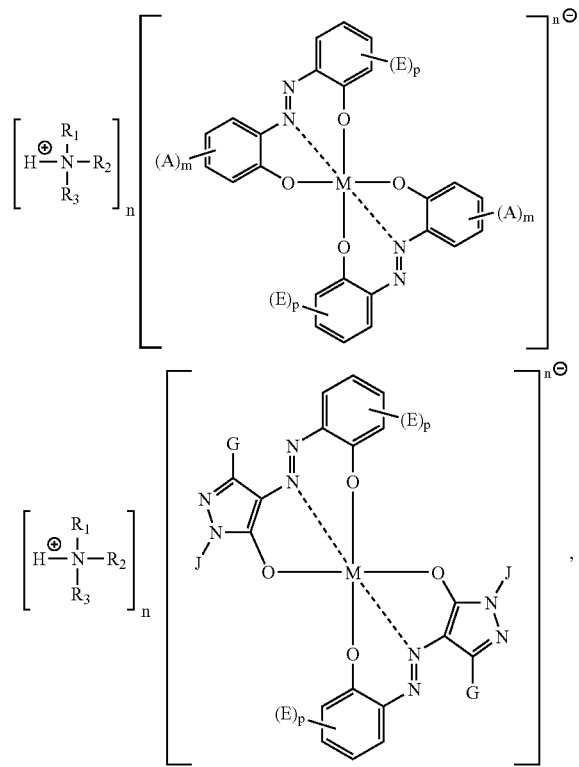

or mixtures thereof, wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and hetero atoms, excluding atoms in any substituents, in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3.

DETAILED DESCRIPTION

Disclosed herein are phase change inks containing colorant compounds of the formulae

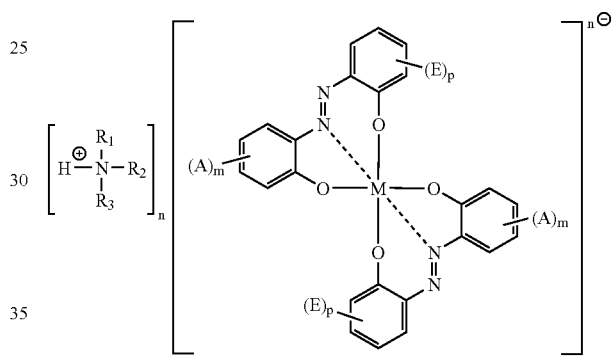

and

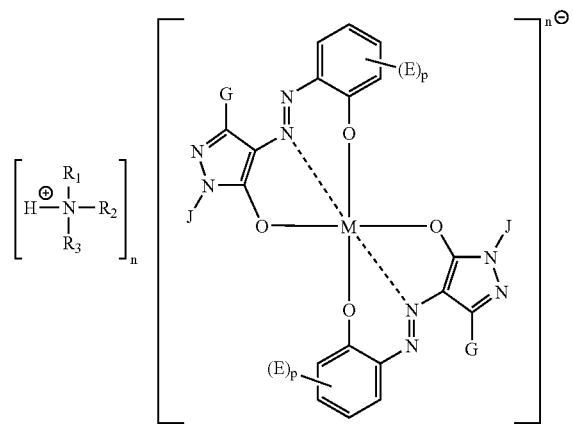

wherein each A, each E, and each G, independently of the other, represents a substituent on a phenyl or pyrazolone ring, such as (but not limited to) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 50 carbon atoms, in another embodiment with no more than about 18 carbon atoms, and in yet another embodiment with no more than about 2 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 14 carbon atoms, and in yet another embodiment with no more than about 10 carbon atoms, although the number of carbon atoms can be outside of these ranges, such as phenyl, naphthyl, anthryl, or the like, an arylalkyl group (including substituted and unsubstituted arylalkyl groups, wherein the alkyl portion of the arylalkyl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as benzyl or the like, an alkylaryl group (including substituted and unsubstituted alkylaryl groups, wherein the alkyl portion of the alkylaryl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as tolyl or the like, a hydroxy group, a halogen atom, an amine group (including primary, secondary, and tertiary amine groups), an imine group, an ammonium group, a cyano group, a pyridine group, a pyridinium group, an ether group, an aldehyde group, a ketone group, an ester group, an amide group, a carbonyl group, a thiocarbonyl group, a sulfate group, a sulfonate group, a sulfonic acid group, a sulfide group, a sulfoxide group, a phosphine group, a phosphonium group, a phosphate group, a nitrile group, a mercapto group, a nitro group, a nitroso group, a sulfone group, an acyl group, an azo group, a cyanato group, a carboxylate group, a carboxylic acid group, a urethane group, a urea group, and the like, wherein G can also be a hydrogen atom, m is an integer of 0, 1, or 2, p is an integer of 0, 1, 2, 3, or 4, and J represents (i) a hydrogen atom, (ii) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 50 carbon atoms, in another embodiment with no more than about 18 carbon atoms, and in yet another embodiment with no more than about 2 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 14 carbon atoms, and in yet another embodiment with no more than about 10 carbon atoms, although the number of carbon atoms can be outside of these ranges, such as phenyl, naphthyl, anthryl, or the like, (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as benzyl or the like, or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 30 carbon atoms, in another embodiment with no more than about 18 carbon atoms, and in yet another embodiment with no more than about 12 carbon atoms, although the number of carbon atoms can be outside of these ranges, such as tolyl or the like, wherein the substituents on the substituted alkyl, aryl, arylalkyl, and alkylaryl groups can be (but are not limited to) hydroxy groups, halogen atoms, amine groups (including primary, secondary, and tertiary amine groups), imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, azo groups, cyanato groups, carboxylate groups, carboxylic acid groups, urethane groups, urea groups, and the like, wherein two or more substituents on the phenyl or pyrazolone rings can be joined together to form a ring. These colorants include chromogenic compounds derived from compounds of the formulae

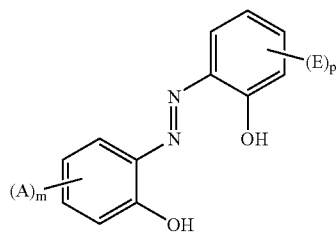

and

-continued

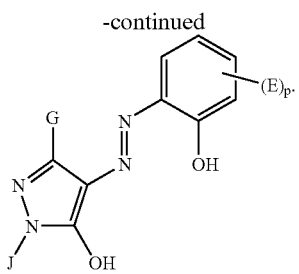

The integer "n" represents both the charge on the chromogen compound complex and the number of countercations present. This integer is at least 1, and can also be 2 or 3.

These compounds form complexes with metal compounds to form chromogenic compounds. Suitable metals M include any metals that form complexes with the above-indicated compounds wherein the complex will have a negative charge of at least −1. Examples of suitable metals include (but are not limited to) chromium, iron, cobalt, molybdenum, tungsten, ruthenium, osmium, rhodium, iridium, manganese, rhenium, vanadium, niobium, tantalum, titanium, zirconium, hafnium, scandium, yttrium, lanthanum, zinc, aluminum, metals in the Lanthanide Series, and the like, as well as mixtures thereof.

While not being limited to any particular theory, it is believed that the complexes formed are as follows:

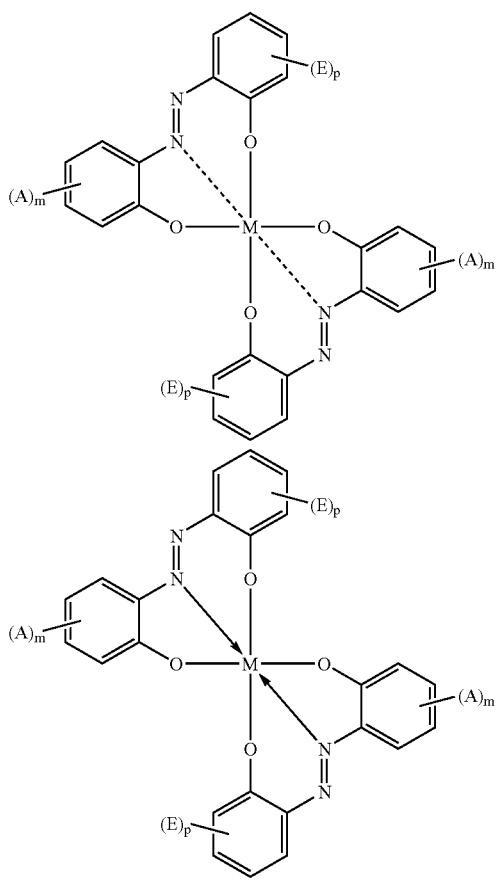

-continued

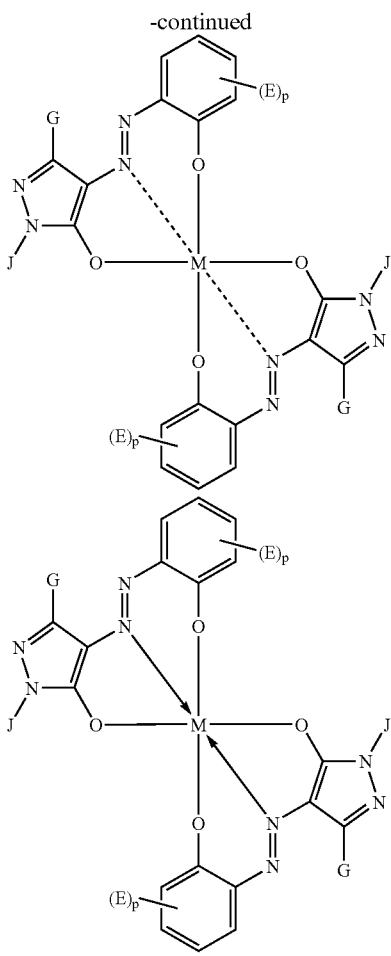

wherein the dotted lines and arrows represent coordination bonds between the lone pair electrons on the nitrogen atoms and the metal atom. Since the oxygen atoms each impart a negative charge to the resulting complex, the resulting charge of the compound depends upon the valence state of the metal.

Some specific examples of suitable chromogenic compound complexes for the compounds disclosed herein include (but are not limited to) the following:

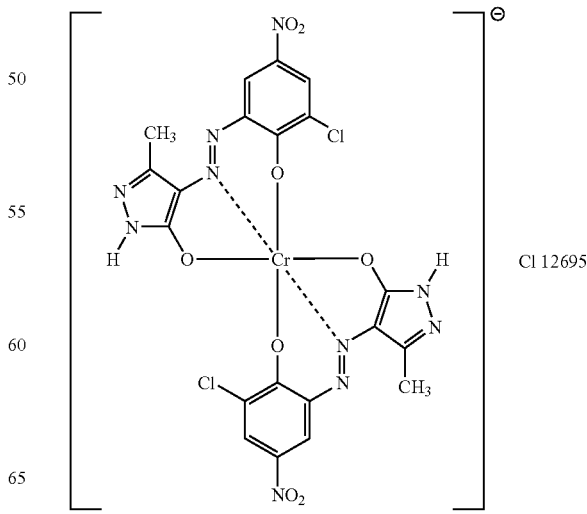

CI 12695

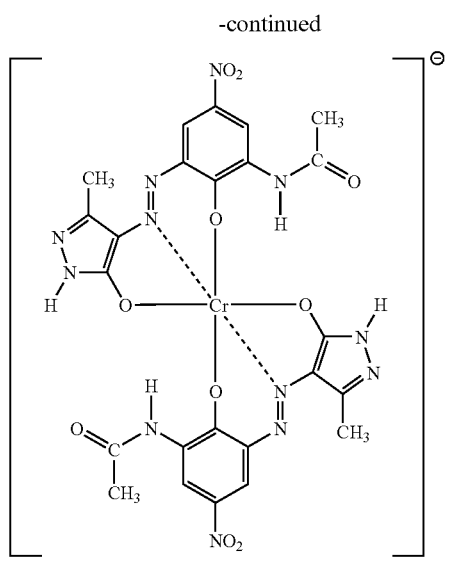
Cl 12696
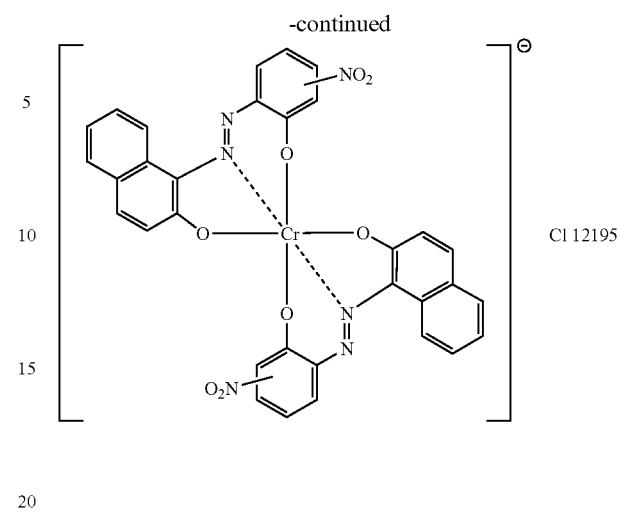
Cl 12195
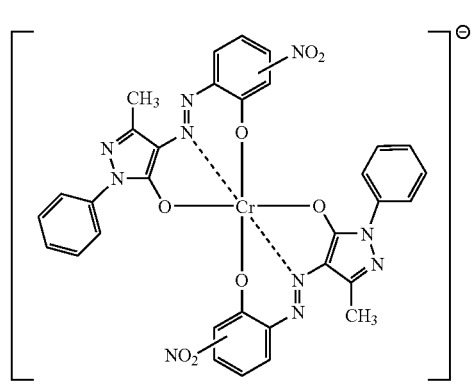
Cl 12716
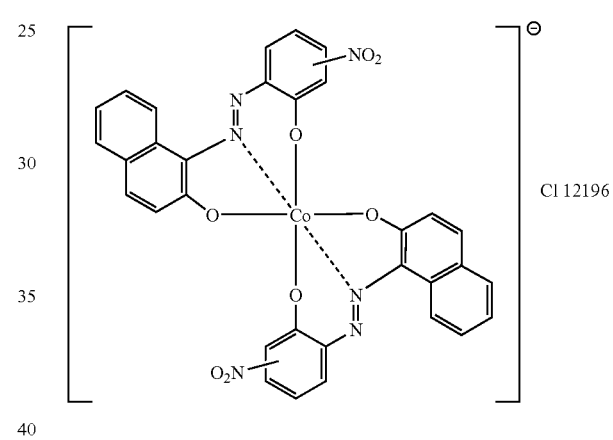
Cl 12196
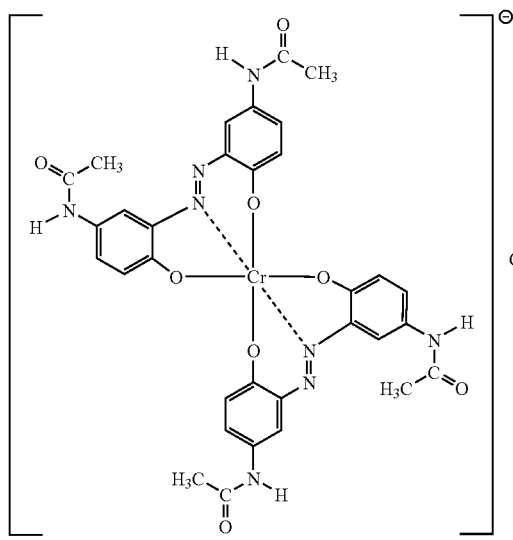
Cl 11836
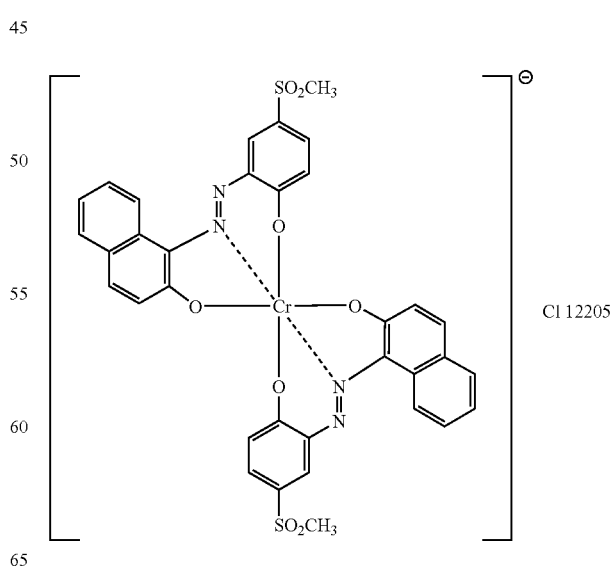
Cl 12205

-continued

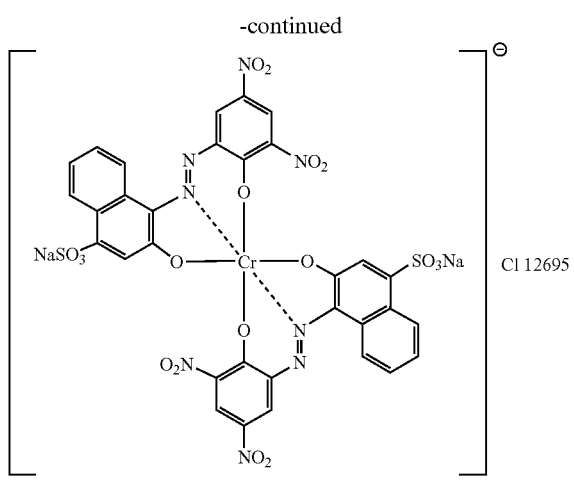

Cl 12695 and the like, as well as mixtures thereof.

The chromogenic compound complexes have a negative charge of at least −1, and accordingly are associated with a counterion. The counterion is of the formula

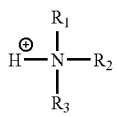

wherein $R_1$, $R_2$, and $R_3$ each, independently of the others, can be (i) a hydrogen atom, (ii) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 150 carbon atoms, in another embodiment with no more than about 54 carbon atoms, and in yet another embodiment with no more than about 48 carbon atoms, although the number of carbon atoms can be outside of these ranges, (iii) an arylalkyl group (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 56 carbon atoms, in another embodiment with no more than about 24 carbon atoms, and in yet another embodiment with no more than about 18 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 56 carbon atoms, in another embodiment with no more than about 24 carbon atoms, and in yet another embodiment with no more than about 18 carbon atoms, although the number of carbon atoms can be outside of these ranges, such as tolyl or the like, provided that the total number of carbon atoms and hetero atoms (excluding atoms in any substituents) in $R_1+R_2+R_3$ is in one embodiment at least about 18, in another embodiment at least about 19, in yet another embodiment at least about 20, in another embodiment at least about 21, in yet another embodiment at least about 22, in still another embodiment at least about 23, and in another embodiment at least about 24, wherein the total number of carbon atoms and hetero atoms (excluding atoms in any substituents) in $R_1+R_2+R_3$ is one embodiment no more than about 150, in another embodiment no more than about 54, and in another embodiment no more than about 48, although the total number of carbon atoms can be outside of this range, wherein the substituents on the substituted alkyl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, azo groups, cyanato groups, carboxylate groups, carboxylic acid groups, urethane groups, urea groups, mixtures thereof, and the like, wherein two or more substituents can be joined together to form a ring. In one embodiment, $R_1$, $R_2$, and $R_3$ are the same as each other. In another embodiment, at least two of $R_1$, $R_2$, and $R_3$ are different from each other. In yet another embodiment, all three of $R_1$, $R_2$, and $R_3$ are different from each other.

The colorant compounds disclosed herein can be prepared by any desired or effective method. For example, a chromogenic compound having a different counterion or in the free acid form can be obtained commercially and the counterion can be replaced with the desired counterion. Metallizing azo dyes can be done by any desired or effective method, such as that described in, for example, "British Intelligence Objectives Subcommittee Report 961," Publications Board No. 86139, Library of Congress, Washington, D.C. 1947, pp. 71-72, 110, 149-151, 160, 163, 164, the disclosure of which is totally incorporated herein by reference. The desired counterions can generally be derived from commercially available amine compounds as well. Primary, secondary, and tertiary amines can also be prepared as described in, for example, *Comprehensive Organic Transformations—A Guide to Functional Group Preparations*, 2$^{nd}$ Ed., Richard C. Larock, Wiley-VCH, 1999 ISBN 0-471-19031-4 New York, N.Y., the disclosure of which is totally incorporated herein by reference.

For example, in one embodiment, the chromogenic compound and the amine compound from which the counterion is to be derived can be heated together until the ion exchange is complete, followed by distilling off the solvent (if a solvent is used) and recovery of the colorant compound thus prepared.

Any desired or effective relative amounts of the chromogenic compound and the amine compound from which the counterion is to be derived can be employed. When the charge on the chromogenic compound is −1, the relative amounts can be, for example, in one embodiment at least about 0.1 mole of chromogenic compound per every one mole of amine compound, in another embodiment at least about 0.5 mole of chromogenic compound per every one mole of amine compound, and in yet another embodiment at least about 0.9 mole of chromogenic compound per every one mole of amine compound, and in one embodiment no more than about 3 moles of chromogenic compound per every one mole of amine compound, in another embodiment no more than about 2 moles of chromogenic compound per every one mole of amine compound, and in yet another embodiment no more than about 1.1 moles of chromogenic compound per every one mole of amine compound, although the relative amounts can be outside of these ranges. When the charge on the chromogenic compound is −2, the amount of amine compound will, of course be doubled, and when the charge on the chromogenic compound is higher, the amount of amine compound will, of course, be adjusted accordingly.

When a solvent is used, any desired or effective solvent can be employed. Examples of suitable solvents include methyl isobutyl ketone, methyl ethyl ketone, acetone, methanol, ethanol, n-propanol, isopropanol, butanol, and the like, as well as mixtures thereof.

The reactants are present in the solvent in any desired or effective amount, in one embodiment at least about 1 gram of reactants per liter of solvent, in another embodiment at least about 225 grams of reactants per liter of solvent, and in yet another embodiment at least about 450 grams of reactants per liter of solvent, and in one embodiment no more than about 2,000 grams of reactants per liter of solvent, in another embodiment no more than about 1,000 grams of reactants per liter of solvent, and in yet another embodiment no more than about 500 grams of reactants per liter of solvent, although the relative amounts of reactants and solvent can be outside of these ranges.

The reactants can be heated to any desired or effective temperature, in one embodiment at least about 25° C., in another embodiment at least about 65° C., and in yet another embodiment at least about 110° C., and in one embodiment no more than about 150° C., in another embodiment no more than about 125° C., and in yet another embodiment no more than about 110° C., although the temperature can be outside of these ranges.

The reactants can be heated for any desired or effective period of time, in one embodiment at least about 1 hour, in another embodiment at least about 12 hours, and in yet another embodiment at least about 16 hours, and in one embodiment no more than about 7 days, in another embodiment no more than about 1 day, and in yet another embodiment no more than about 18 hours, although the period of time can be outside of these ranges.

Thereafter, the colorant compound thus prepared can be recovered by any desired or effective method, such as by distillation, vacuum, quenching into a solvent in which the product is not soluble (such as water), or the like.

Phase change inks as disclosed herein contain a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, triamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

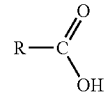

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information oh fatty amide carrier materials is disclosed in, for example, U.S. Pat. Nos. 4,889,560, 4,889,761, 5,194,638, 4,830,671, 6,174,937, 5,372,852, 5,597,856, 6,174,937, and British Patent GB 2 238 792, the disclosures of each of which are totally incorporated herein by reference. Also suitable are branched triamides as disclosed in U.S. Pat. No. 6,860,930, the disclosure of which is totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed as the ink carrier composition.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

Specific examples of suitable waxes include polyethylene waxes such as PE 500 and PE 655, available from Baker Petrolite, Tulsa, Okla., Fischer-Tropsch waxes, available from Sasol Wax Americas, Inc., Shelton, Conn., waxes as disclosed in, for example, Copending application Ser. No. 11/126,745 and U.S. Patent Publication 2005/0130054, the disclosures of which are totally incorporated herein by reference, and waxes as disclosed in Applications Ser. Nos. 11/290,221, 11/291,055, 11/290,263, 11/290,222, and Ser. No. 11/290,265, filed concurrently herewith, the disclosures of each of which are totally incorporated herein by reference.

In one specific embodiment, the phase change ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 80 percent by weight of the ink, in another embodiment of no more than about 70 percent by weight of the ink, and in yet another embodiment of no more than about 60 percent by weight of the ink, although the amount can be outside of these ranges; (b) a stearyl stearamide wax, present in the ink in an amount in one embodiment of at least about 3 percent by weight of the ink, in another embodiment of at least about 5 percent by weight of the ink, and in yet another embodiment of at least about 8 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the ink in an amount in one embodiment of at least about 5 percent by weight of the ink, in another embodiment of at least about 8 percent by weight of the ink, and in yet another embodiment of at least about 10 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based propoxylate alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change inks contain a colorant compound of the formula

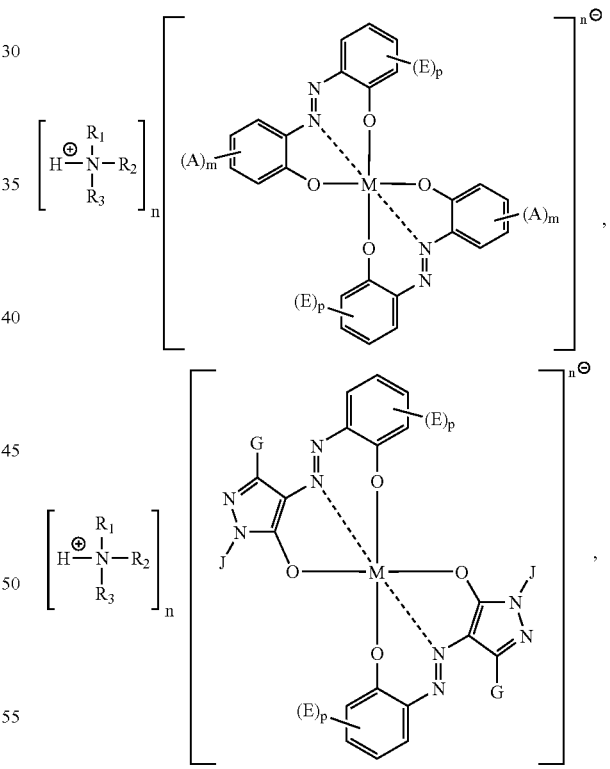

or mixtures thereof. This colorant is present in the ink in any desired or effective amount to obtain the desired color or hue, in one embodiment of at least about 0.1 percent by weight of the ink, in another embodiment of at least about 0.5 percent by weight of the ink, in yet another embodiment of at least about 1 percent by weight of the ink, in still another embodiment of at least about 2 percent by weight of the ink, and in another embodiment of at least about 3 percent by weight of the ink, and in one embodiment of no more than about 20 percent by weight of the ink, in another embodiment of no more than about 13 percent by weight of the ink, and in yet another embodiment of no more than about 10 percent by weight of the ink, although the amount can be outside of these ranges. The colorant as disclosed herein can either be the sole colorant in the ink or can be present in combination with other colorants.

In one specific embodiment, the colorant is present in combination with Disperse Orange 47. In this embodiment, the ratio of this colorant to Disperse Orange 47 can be any ratio desired to obtain the desired color or hue, in one embodiment at least about 0.01 part by weight Disperse Orange 47 per every one part by weight colorant as disclosed herein, in another embodiment at least about 0.05 part by weight Disperse Orange 47 per every one part by weight colorant as disclosed herein, and in yet another embodiment at least about 0.1 part by weight Disperse Orange 47 per every one part by weight colorant as disclosed herein, and in one embodiment no more than about 1 part by weight Disperse Orange 47 per every one part by weight colorant as disclosed herein, in another embodiment no more than about 0.8 part by weight Disperse Orange 47 per every one part by weight colorant as disclosed herein, and in yet another embodiment no more than about 0.5 part by weight Disperse Orange 47 per every one part by weight colorant as disclosed herein, although the relative amounts can be outside of these ranges.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these ranges, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions in one embodiment have melting points of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

The ink compositions generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges. In another specific embodiment, the inks have viscosities of from about 7 to about 15 centipoise at temperatures of about 110, 115, and/or 120° C.

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are illustrative, and the claims are not limited to the materials, conditions, or process parameters set forth in these embodiments. All parts and percentages are by weight unless otherwise indicated.

EXAMPLE I

To a 2-liter 3-necked round bottom flask equipped with TEFLON® coated magnet, silicone oil bath, magnetically stirred hot plate, and condenser was charged 1,100 g methyl isobutyl ketone (obtained from Aldrich Chemical Co., Milwaukee, Wis.). Stirring was initiated and Solvent Black 45 free acid dye (about 250 g, 0.275 moles, obtained from Orient Chemical Industries Ltd, Osaka, Japan), of the formula

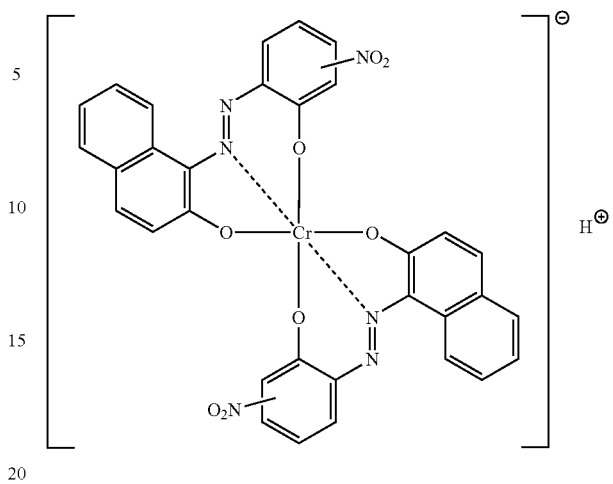

was added to the flask. The oil bath was heated to 120° C. for about 2 hours until the dye was completely dissolved. About 196.3 g (0.20 moles) of distearyl amine (ARMEEN® 2HT, obtained from Akzo Nobel, McCook, Ill.) was subsequently added, and the reaction mixture was then refluxed for about 16 hours. A distillation setup was subsequently attached and the solvent was distilled off with the aid of a nitrogen inlet. When the distillation appeared complete, vacuum was applied to the system. The vacuum was gradually increased to prevent foaming and was held for about 16 hours at 120° C. The flask was then transferred to an oven at 120° C. and secured upside down, and the product was collected. The product was believed to be of the formula

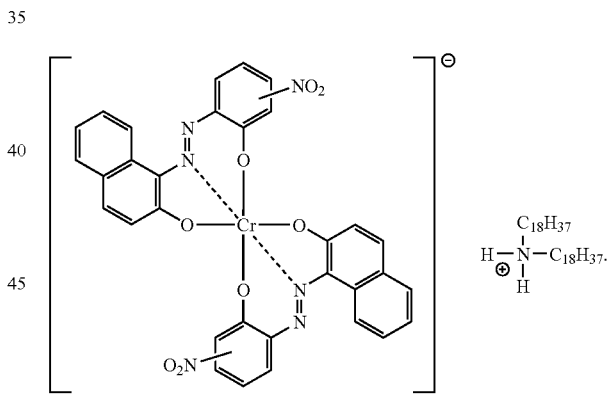

EXAMPLE II

To a 100-milliliter 3-necked round bottom flask equipped with TEFLON® coated magnet, silicone oil bath, magnetically stirred hot plate, and condenser was charged 75 g methyl isobutyl ketone (obtained from Aldrich Chemical Co., Milwaukee, Wis.). Stirring was initiated and Solvent Black 45 free acid dye (about 10 g, 0.015 moles, obtained from Orient Chemical Industries Ltd, Osaka, Japan) was added to the flask. The oil bath was heated to 120° C. for about 0.5 hours until the dye was completely dissolved. About 6.2 g (0.015 moles) of PA28 (obtained from Tomah Products Inc., Milton, Wis.) was subsequently added, and the reaction mixture was then refluxed for about 16 hours. A distillation setup was thereafter attached and the solvent was distilled off with the aid of a nitrogen inlet. When the distillation appeared complete, the flask was then transferred to an oven at 120° C. and secured upside down for about 1 hour, and the product was collected. The product was believed to be of the formula

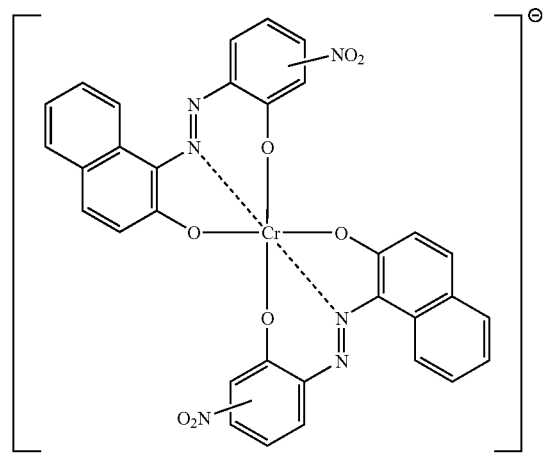

about 0.5 hours until the dye was completely dissolved. About 2.9 g (0.0075 moles) of PROPOMEEN O/12 (obtained from Akzo Nobel, McCook, Ill.) was subsequently added, and the reaction mixture was then refluxed for about

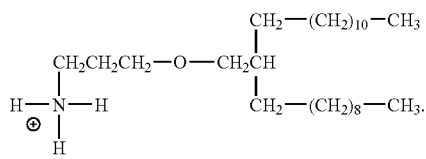

EXAMPLE III

The process of Example II was repeated except that about 5.11 g (0.015 moles) of SA19.3 (obtained from Tomah Products Inc., Milton, Wis.) was substituted for the 6.2 g (0.015 moles) of PA28. The product was believed to be of the formula 16 hours. A distillation setup was thereafter attached and the solvent was distilled off with the aid of a nitrogen inlet. When the distillation appeared complete, the flask was then transferred to an oven at 120° C. and secured upside down for about 1 hour, and the product was collected. The product was believed to be of the formula

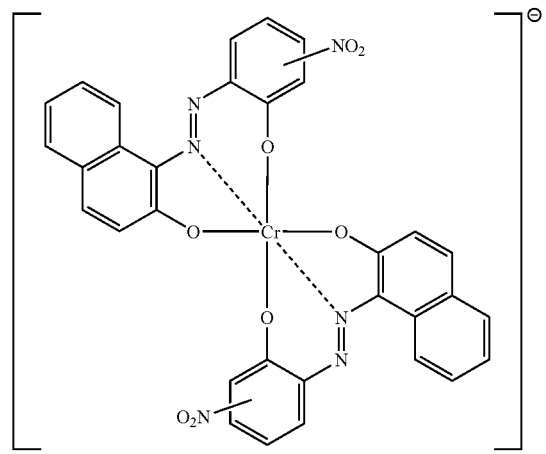

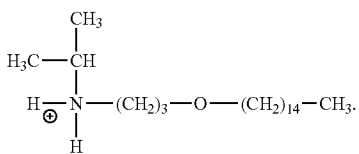

EXAMPLE IV

To a 100-milliliter 3-necked round bottom flask equipped with TEFLON® coated magnet, silicone oil bath, magnetically stirred hot plate, and condenser was charged 35 g methyl isobutyl ketone (obtained from Aldrich Chemical Co., Milwaukee, Wis.). Stirring was initiated and Solvent Black 45 free acid dye (about 5 g, 0.0075 moles, obtained from Orient Chemical Industries Ltd, Osaka, Japan) was added to the flask. The oil bath was heated to 120° C. for

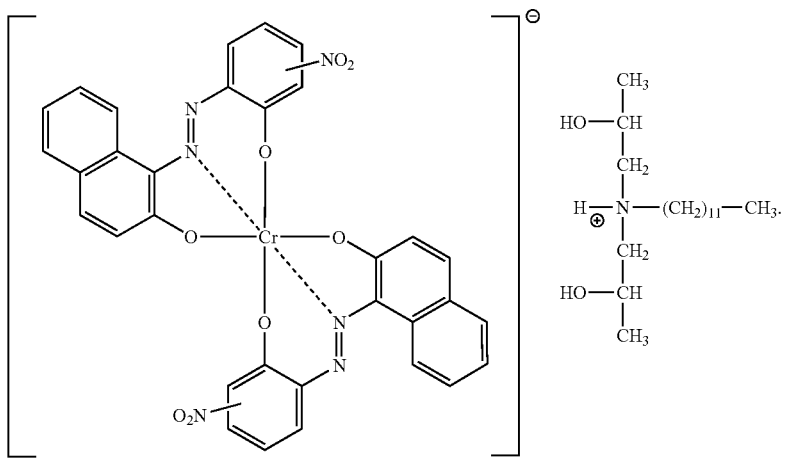
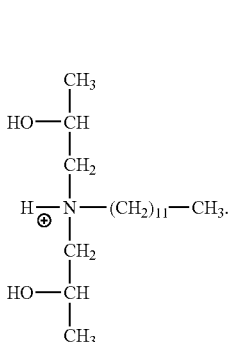

EXAMPLE V

The process of Example II was repeated except that about 10.3 g (0.015 moles) of trihexadecylamine (ARMEEN® 316 obtained from Akzo Nobel, McCook, Ill.) was substituted for the 6.2 g (0.015 moles) of PA28. The product was believed to be of the formula

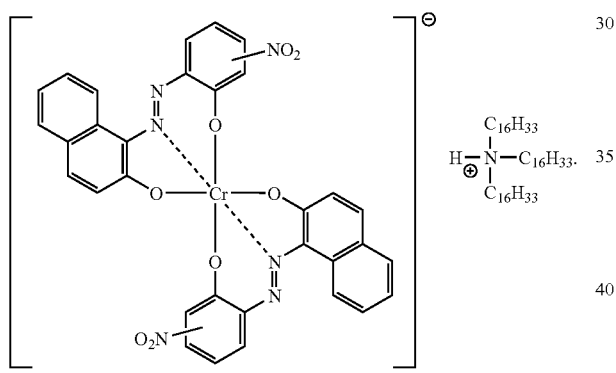

EXAMPLE VI

The process of Example II was repeated except that about 7.8 g (0.015 moles) of tridodecylamine (ARMEEN® 312 obtained from Akzo Nobel, McCook, Ill.) was substituted for the 6.2 g (0.015 moles) of PA28. The product was believed to be of the formula

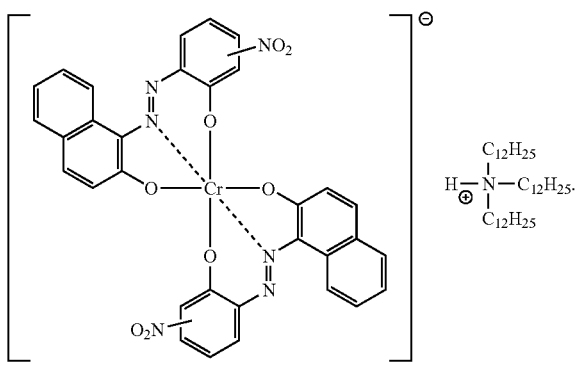

EXAMPLE VII

The processes of Examples I through VI are repeated using CI 12695 as the free acid dye instead of Solvent Black 45 (CI 12195). It is believed that similar results will be obtained.

EXAMPLE VIII

The processes of Examples I through VI are repeated using CI 12696 as the free acid dye instead of Solvent Black 45 (CI 12195). It is believed that similar results will be obtained.

EXAMPLE IX

The processes of Examples I through VI are repeated using CI 12716 as the free acid dye instead of Solvent Black 45 (CI 12195). It is believed that similar results will be obtained.

EXAMPLE X

The processes of Examples I through VI are repeated using CI 11836 as the free acid dye instead of Solvent Black 45 (CI 12195). It is believed that similar results will be obtained.

EXAMPLE XI

The processes of Examples I through VI are repeated using CI 12196 as the free acid dye instead of Solvent Black 45 (CI 12195). It is believed that similar results will be obtained.

EXAMPLE XII

The processes of Examples I through VI are repeated using CI 12205 as the free acid dye instead of Solvent Black 45 (CI 12195). It is believed that similar results will be obtained.

INK EXAMPLES

Ink compositions were prepared by the following process. All ink ingredients except colorant(s) were charged into a stainless steel beaker. The resulting mixture was then melted together in an oven, followed by blending by stirring in a temperature controlled mantle at the same temperature as the oven for about 0.3 hour, at a temperature of about 110° C. for Inks A and B and Comparative Ink 1 and at a temperature of about 135 for Ink C. To this mixture was then added the colorant(s). After stirring for about 2 additional hours, the ink thus formed was filtered through a heated MOTT® apparatus (obtained from Mott Metallurgical) using Whatman #3 filter paper under a pressure of about 15 pounds per square inch. The filtered phase change ink thus formed was poured into molds and allowed to solidify to form ink sticks. Inks were prepared from the following ingredients: polyethylene wax (PE 500, obtained from Baker Petrolite, Tulsa, Okla.); polyethylene wax (PE 655, obtained from Baker Petrolite, Tulsa, Okla.); a branched triamide of the formula

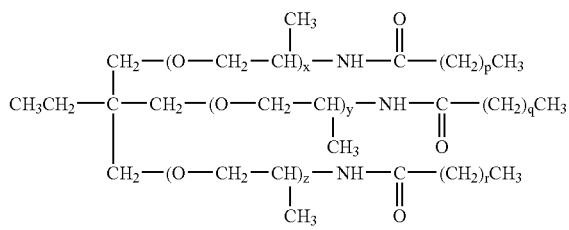

wherein p, q, and r each have an average value of about 35, prepared as described in Example II of U.S. Pat. No. 6,860,930, the disclosure of which is totally incorporated herein by reference; a tetra-amide (obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference); stearyl stearamide wax (KEMAMIDE® S-180, obtained from Crompton Corporation, Greenwich, Conn.); KE-100 Resin (triglycerides of hydrogenated abietic (rosin) acid, commercially available from Arakawa Chemical Industries, Ltd.); a urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference (hereinafter referred to as urethane resin #1); a urethane resin that was the adduct of three equivalents of stearyl isocyanate and a glycerol-based alcohol, prepared as described in Example 4 of U.S. Pat. No. 6,309,453, the disclosure of which is totally incorporated herein by reference (hereinafter referred to as urethane resin #2); NAUGUARD® 445 antioxidant (obtained from Uniroyal Chemical Co., Middlebury, Conn.); Disperse Orange 47 dye (DO-47, obtained from Keystone Aniline Corporation, Chicago, Ill.), and the colorant prepared as described in Example I. The amounts of each ingredient are listed in the table below for each ink:

| | Ink | | | |
|---|---|---|---|---|
| | A | B | C | 1 |
| polyethylene wax 500 | 55.45 | 52.28 | 0 | 56.50 |
| polyethylene wax 655 | 0 | 0 | 35.95 | 0 |
| branched triamide | 10.99 | 12.29 | 0 | 11.2 |
| tetra-amide | 0 | 0 | 13.41 | 0 |
| stearyl stearamide wax | 13.53 | 15.03 | 23.99 | 13.60 |
| KE-100 Resin | 9.70 | 10.86 | 0 | 10.20 |
| urethane resin # 1 | 0 | 0 | 12.26 | 0 |
| urethane resin # 2 | 3.96 | 4.37 | 8.02 | 4.0 |
| antioxidant | 0.18 | 0.17 | 0.20 | 0.20 |
| DO-47 | 0.20 | 0.20 | 0.20 | 0.20 |
| Example I colorant | 5.99 | 4.80 | 5.99 | 0 |
| Solvent Black 45 | 0 | 0 | 0 | 4.10 |

To evaluate the dye solubility in the ink base, spectral strengths at 580 nm of the inks were used as the measurement of dye solubility in the filtered and unfiltered inks. Any undissolved dye in the ink was filtered out, resulting in the smaller spectral strength of the filtered ink compared to that of the unfiltered ink. Accordingly, the ratio of the filtered ink's spectral strength to the unfiltered ink's spectral strength ("SS ratio") is a measure of dye solubility; to the degree that the SS ratio is significantly less than 1, it indicates poor solubility of the dye in the ink base. Glass transition temperature ($T_g$) was measured by Dynamic Mechanic Analysis using a Rheometrics Solid Analyzer (RSA II). Melting point and freezing point were measured by Differential Scanning Calorimetry (DSC) using a DUPONT 2100 calorimeter.

| | Ink | | | |
|---|---|---|---|---|
| | A | B | C | 1 |
| unfiltered spectral strength at 380 nm | 1014 | 812 | 1030 | 884 |
| unfiltered spectral strength at 480 nm | 973 | 827 | 959 | 808 |
| unfiltered spectral strength at 580 nm | 1142 | 886 | 1115 | 928 |
| filtered spectral strength at 380 nm | 993 | 796 | 1028 | 543 |
| filtered spectral strength at 480 nm | 841 | 724 | 957 | 490 |
| filtered spectral strength at 580 nm | 1129 | 883 | 1111 | 545 |
| SS ratio (filtered/unfiltered at 580 nm) | 0.99 | 1.00 | 1.00 | 0.69 |
| viscosity at 110° C. (centipoise) (filtered) | 10.45 | 10.83 | — | 9.59 |
| viscosity at 140° C. (centipoise) (filtered) | — | — | 10.86 | — |
| $T_g$ | 9.63 | 11.8 | — | — |
| melting point (° C.) | 80.2 | 80.2 | — | — |
| freezing point (° C.) | 67.2, 72.4 | 68.7, 74.5 | — | — |

Inks A and B were incorporated into a XEROX® PHASER® 8400 modified to print at 110° C. and printed successfully. Ink C was incorporated into a XEROX® PHASER® 8400 printing at the standard printing temperature and was printed successfully. As the data indicate, the colorant prepared in Example I dissolved well in the inks. In contrast, the commercial colorant dissolved poorly, as indicated by the spectral strength ratio of filtered to unfiltered ink at 580 nanometers of 0.69.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising a phase change ink carrier and a colorant compound of the formula

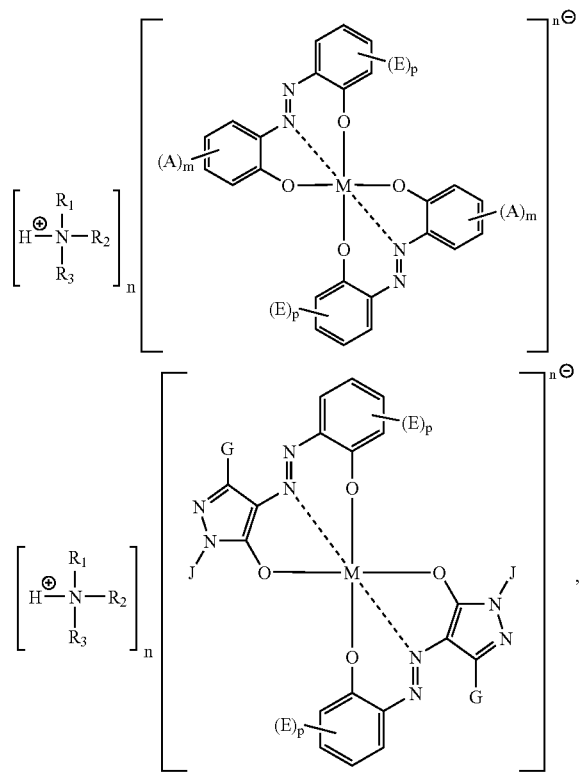

or mixtures thereof, wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and hetero atoms, excluding atoms in any substituents, in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3.

2. An ink according to claim 1 wherein the colorant is of the formula

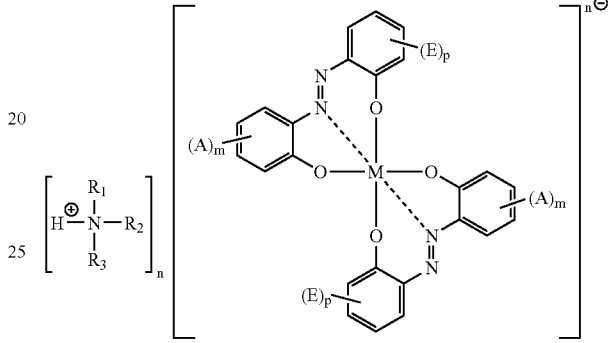

3. An ink according to claim 1 wherein the colorant is of the formula

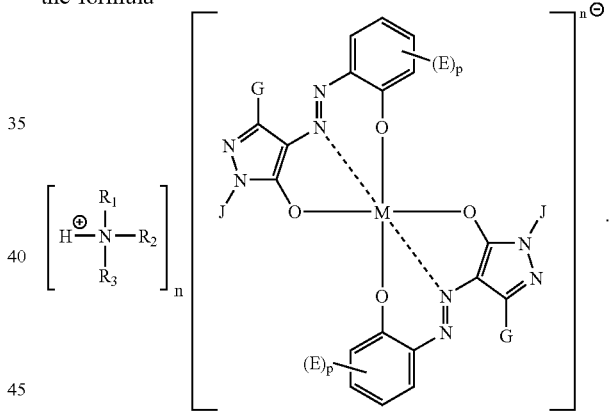

4. An ink according to claim 1 wherein at least one of A, E, G, and J is an alkyl group, provided that when A is the at least one alkyl group, m is at least 1, and provided that when E is the at least one alkyl group, p is at least 1.

5. An ink according to claim 4 wherein the alkyl group is a substituted alkyl group.

6. An ink according to claim 4 wherein the alkyl group is an unsubstituted alkyl group.

7. An ink according to claim 4 wherein the alkyl group contains at least one heteroatom therein.

8. An ink according to claim 4 wherein the alkyl group contains no heteroatoms therein.

9. An ink according to claim 1 wherein at least one of A, E, G, and J is an aryl group, provided that when A is the at least one aryl group, m is at least 1, and provided that when E is the at least one aryl group, p is at least 1.

10. An ink according to claim 9 wherein the aryl group is a substituted aryl group.

11. An ink according to claim 9 wherein the aryl group is an unsubstituted aryl group.

12. An ink according to claim 9 wherein the aryl group contains at least one heteroatom therein.

13. An ink according to claim 9 wherein the aryl group contains no heteroatoms therein.

14. An ink according to claim 1 wherein at least one of A, E, G, and J is an arylalkyl or alkylaryl group, provided that when A is the at least one arylalkyl or alkylaryl group, m is at least 1, and provided that when E is the at least one arylalkyl or alkylaryl group, p is at least 1.

15. An ink according to claim 14 wherein the arylalkyl or alkylaryl group is a substituted arylalkyl or alkylaryl group.

16. An ink according to claim 14 wherein the arylalkyl or alkylaryl group is an unsubstituted arylalkyl or alkylaryl group.

17. An ink according to claim 14 wherein the arylalkyl or alkylaryl group contains at least one heteroatom therein.

18. An ink according to claim 14 wherein the arylalkyl or alkylaryl group contains no heteroatoms therein.

19. An ink according to claim 1 wherein at least one of A, E, and G is a substituent selected from the group consisting of a hydroxy group, a halogen atom, an amine group an imine group, an ammonium group, a cyano group, a pyridine group, a pyridinium group, an ether group, an aldehyde group, a ketone group, an ester group, an amide group, a carbonyl group, a thiocarbonyl group, a sulfate group, a sulfonate group, a sulfonic acid group, a sulfide group, a sulfoxide group, a phosphine group, a phosphonium group, a phosphate group, a nitrile group, a mercapto group, a nitro group, a nitroso group, a sulfone group, an acyl group, an azo group, a cyanato group, a carboxylate group, a carboxylic acid group, a urethane group, a urea group, or mixtures thereof, provided that when A is the at least one substituent, m is at least 1, and provided that when E is the at least one substituent, p is at least 1.

20. An ink according to claim 1 wherein n is 1.

21. An ink according to claim 1 wherein n is 2.

22. An ink according to claim 1 wherein n is 3.

23. An ink according to claim 1 wherein M is a metal in the Lanthanide Series.

24. An ink according to claim 1 wherein M is chromium, iron, cobalt, molybdenum, tungsten, ruthenium, osmium, rhodium, iridium, manganese, rhenium, vanadium, niobium, tantalum, titanium, zirconium, hafnium, scandium, yttrium, lanthanum, zinc, aluminum, or mixtures thereof.

25. An ink according to claim 1 wherein M is chromium, iron, cobalt, or mixtures thereof.

26. An ink according to claim 1 wherein M is chromium.

27. An ink according to claim 1 wherein the colorant is of the formula

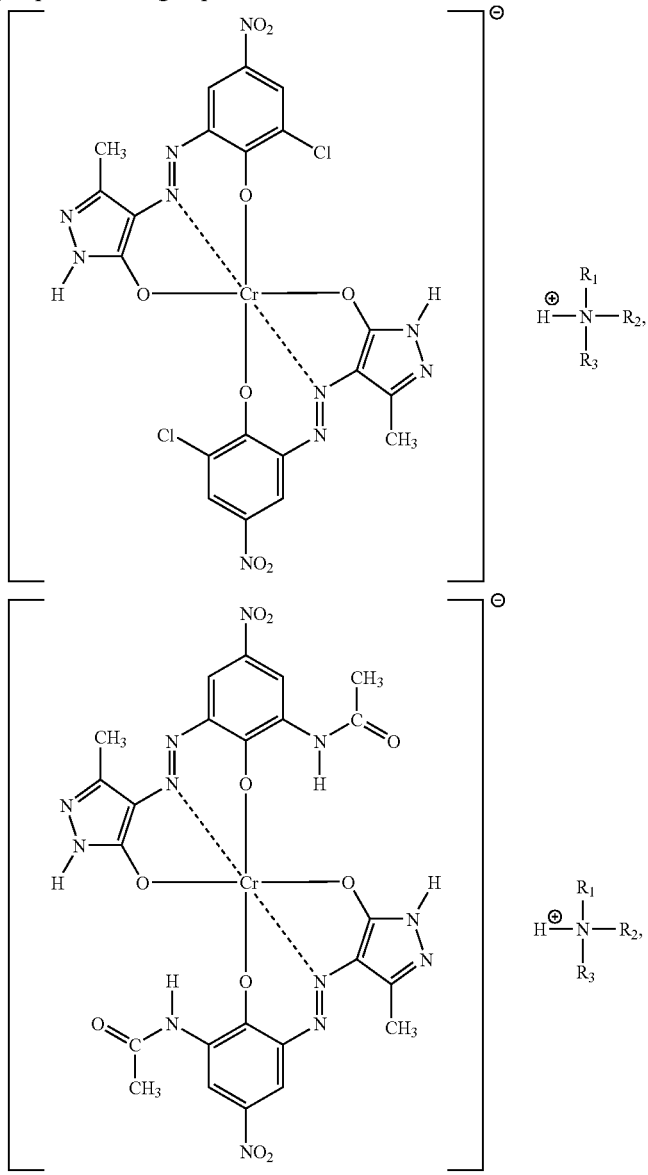

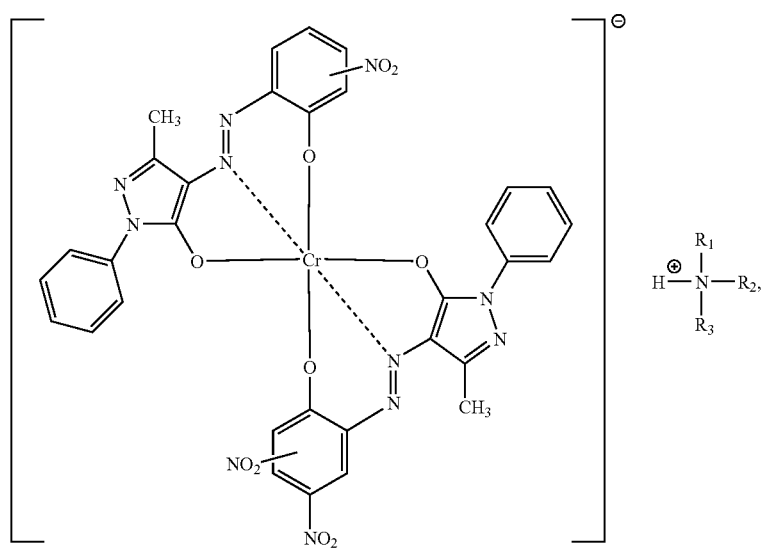
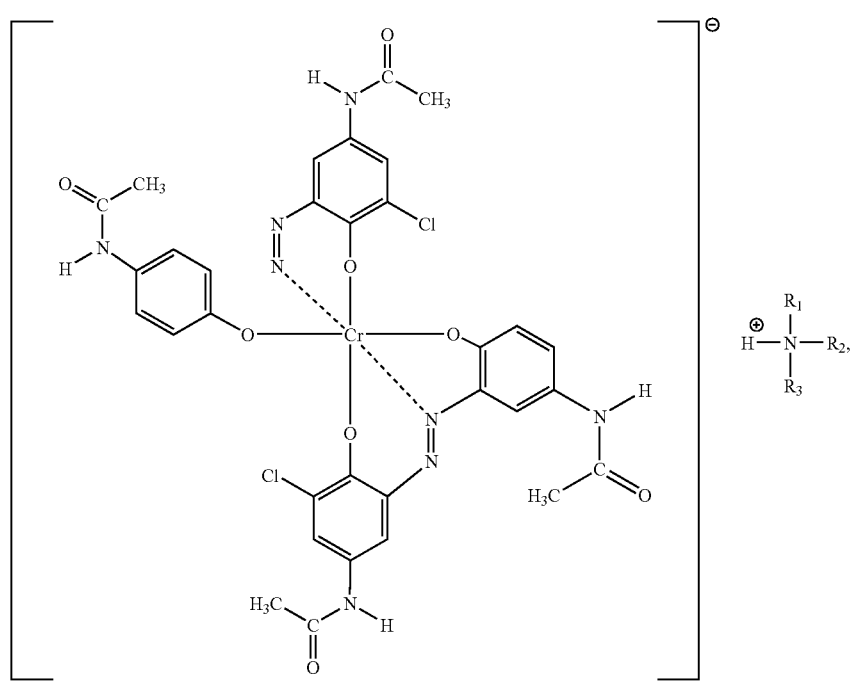
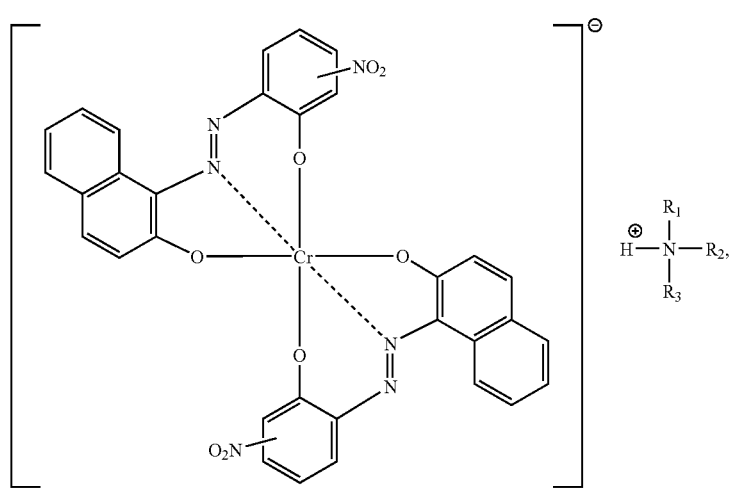

-continued
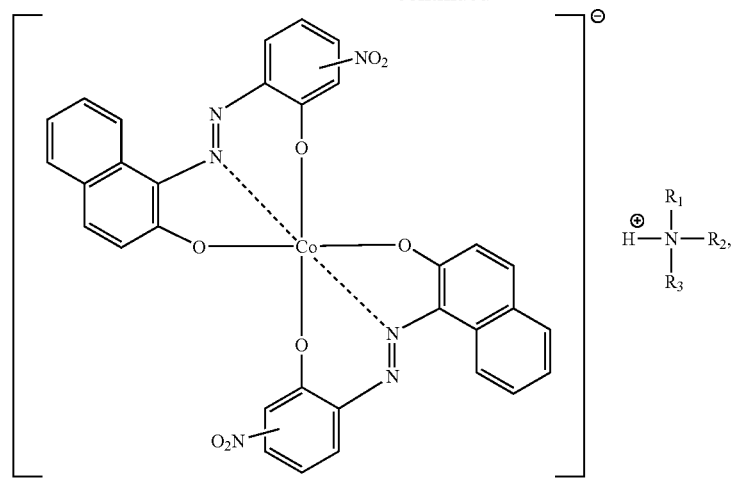 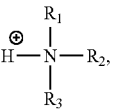
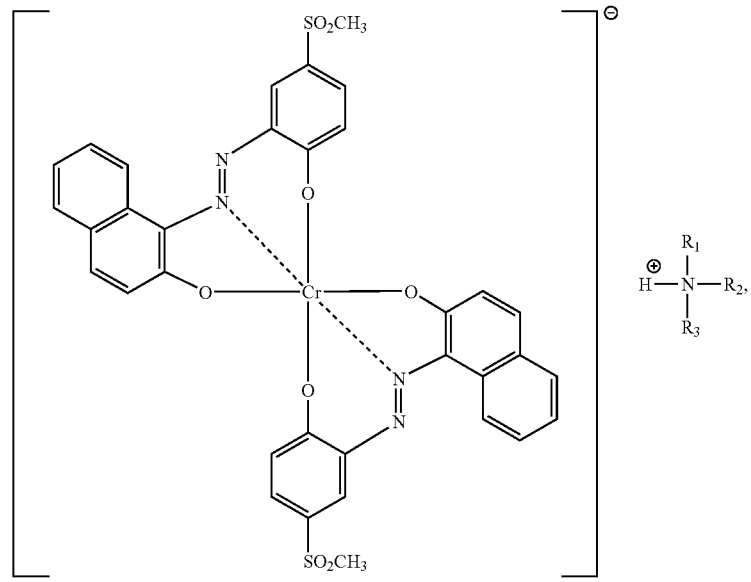 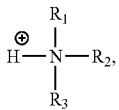
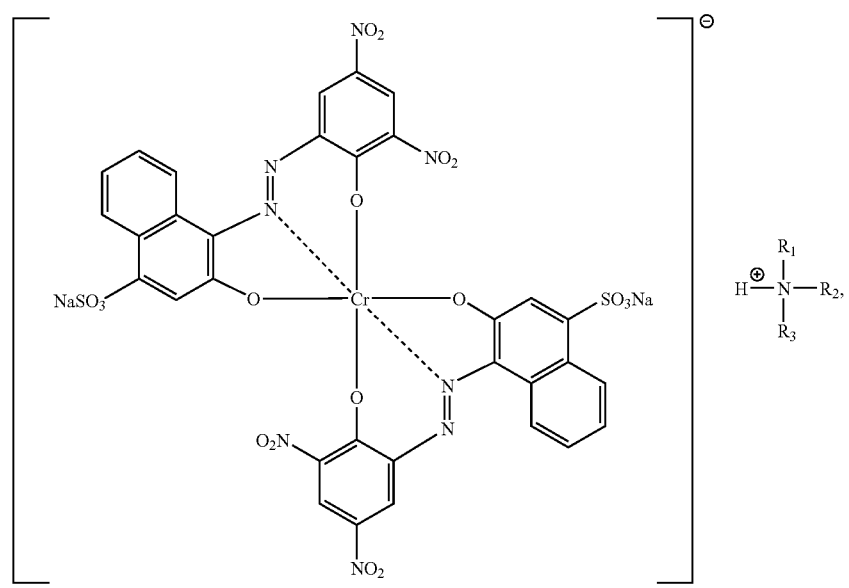 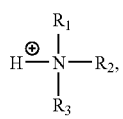
or mixtures thereof.

28. An ink according to claim 1 wherein the colorant is of the formula

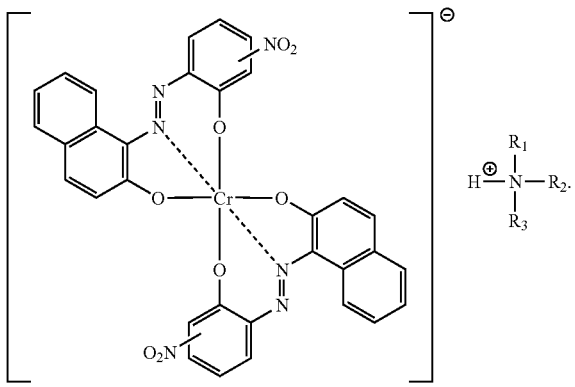

29. An ink according to claim 1 wherein $R_1$, $R_2$, and $R_3$ each, independently of the others, are hydrogen atoms or alkyl groups, including linear and branched, saturated and unsaturated, cyclic and acyclic, and substituted and unsubstituted alkyl groups, and wherein hetero atoms, such as oxygen, nitrogen, sulfur, silicon, phosphorus, boron, and the like either may or may not be present in the alkyl group.

30. An ink according to claim 29 wherein at least one of the alkyl groups is linear.

31. An ink according to claim 29 wherein at least one of the alkyl groups is branched.

32. An ink according to claim 29 wherein at least one of the alkyl groups is substituted.

33. An ink according to claim 29 wherein at least one of the alkyl groups is unsubstituted.

34. An ink according to claim 29 wherein at least one of the alkyl groups has hetero atoms therein.

35. An ink according to claim 29 wherein at least one of the alkyl groups has no hetero atoms therein.

36. An ink according to claim 29 wherein $R_1$, $R_2$, and $R_3$ are the same as each other.

37. An ink according to claim 29 wherein at least two of $R_1$, $R_2$, and $R_3$ are different from each other.

38. An ink according to claim 29 wherein all three of $R_1$, $R_2$, and $R_3$ are different from each other.

39. An ink according to claim 1 wherein at least one of $R_1$, $R_2$, and $R_3$ is an aryl group, an arylalkyl group, or an alkylaryl group.

40. An ink according to claim 39 wherein the aryl, arylalkyl, or alkylaryl group is substituted.

41. An ink according to claim 39 wherein the aryl, arylalkyl, or alkylaryl group is unsubstituted.

42. An ink according to claim 39 wherein the aryl, arylalkyl, or alkylaryl group contains at least one heteroatom therein.

43. An ink according to claim 39 wherein the aryl, arylalkyl, or alkylaryl group contains no heteroatoms therein.

44. An ink according to claim 1 wherein the colorant compound is of the formula

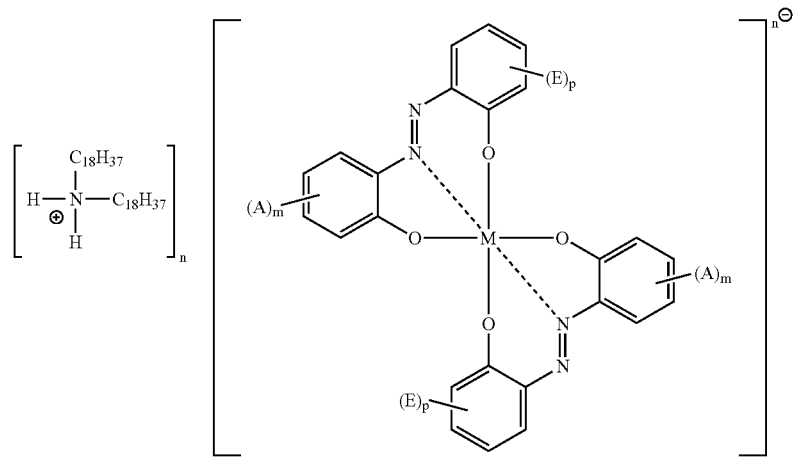

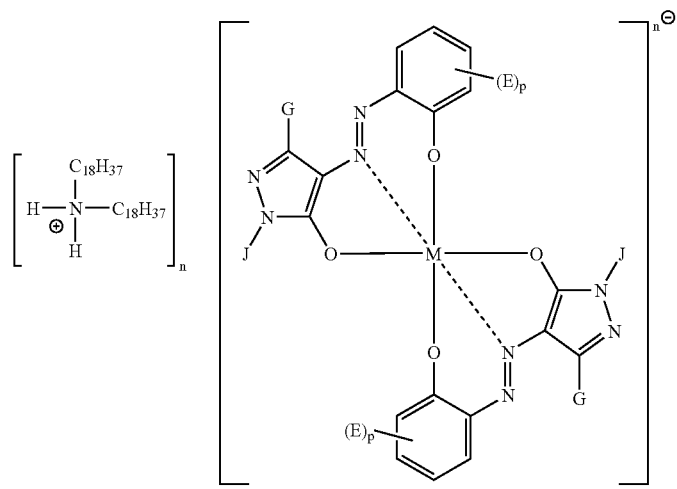
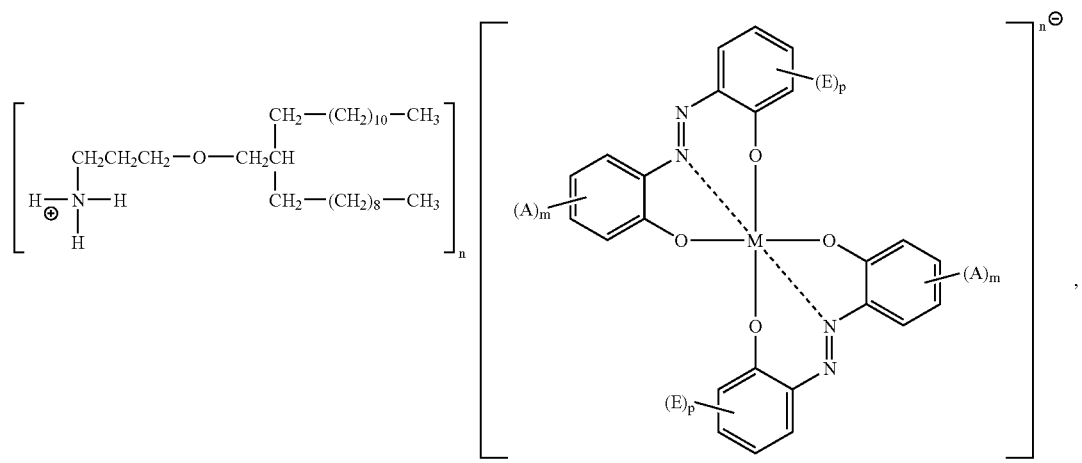
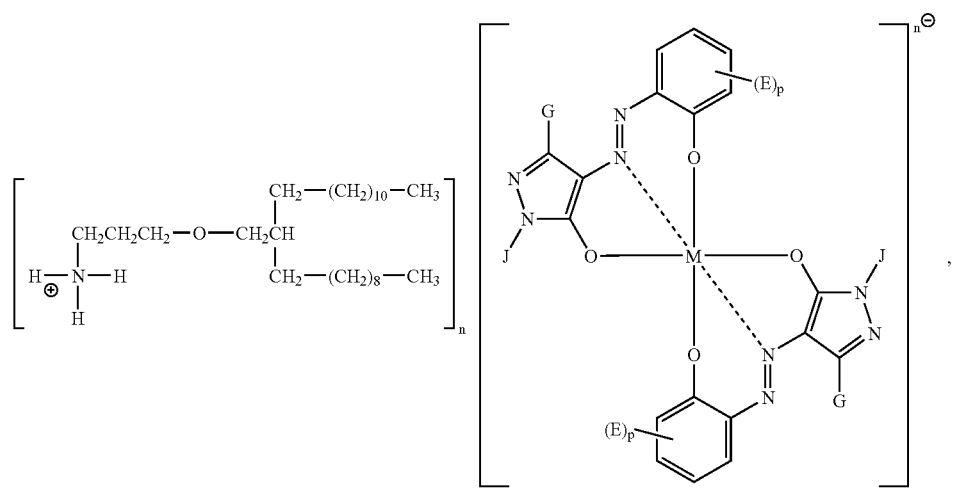

-continued
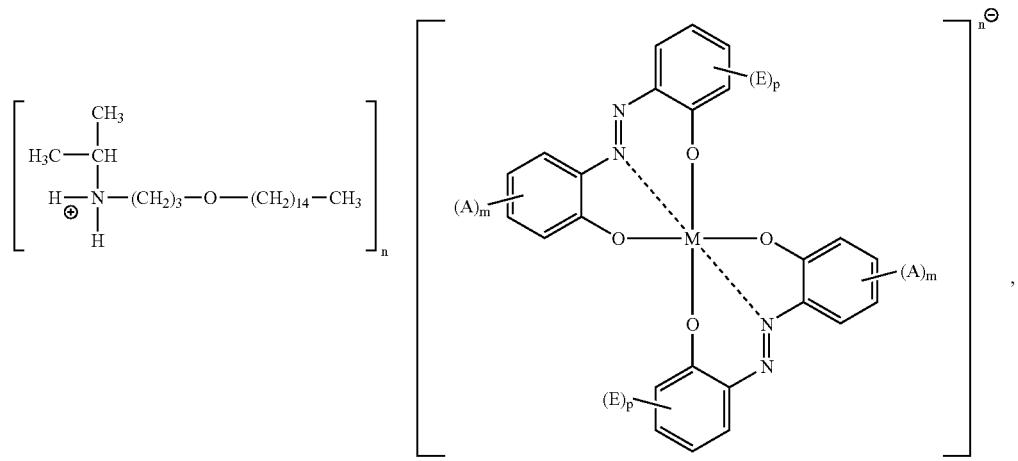
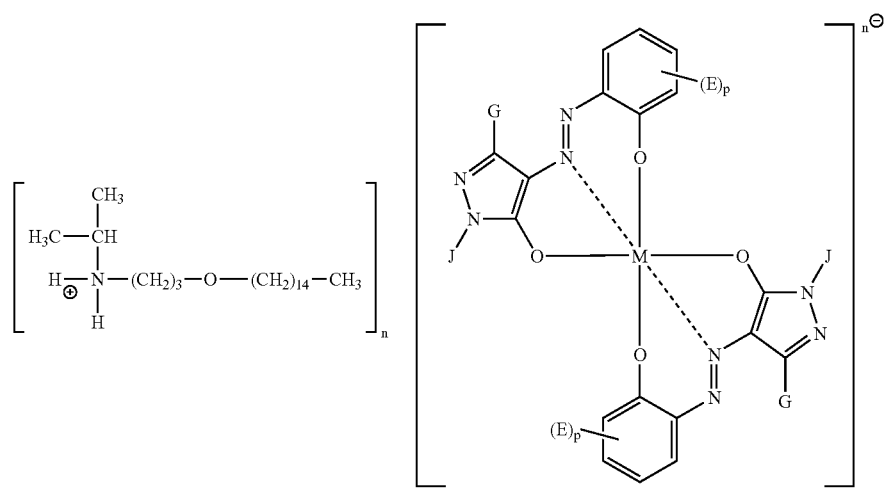
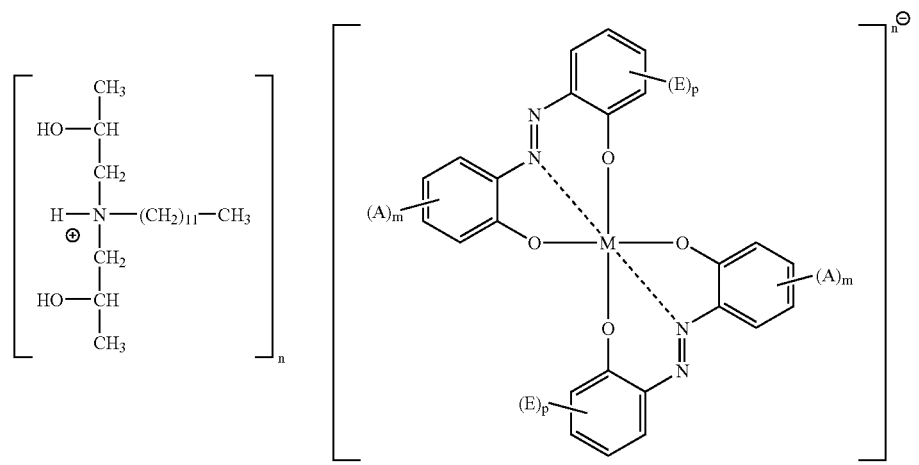

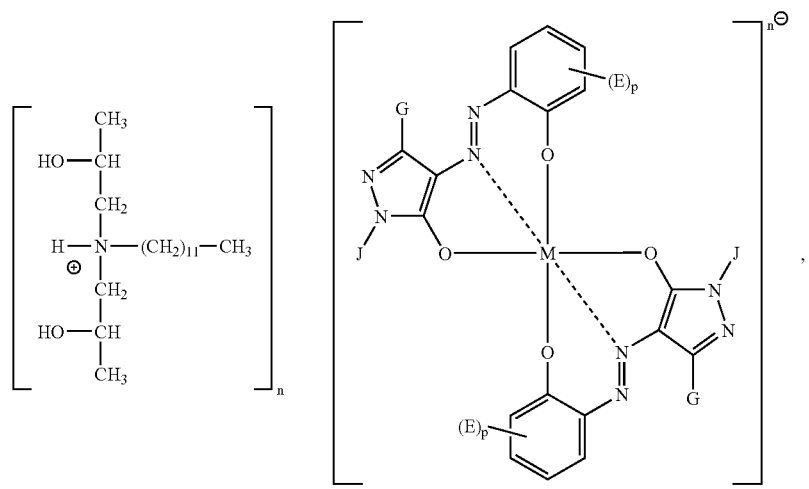
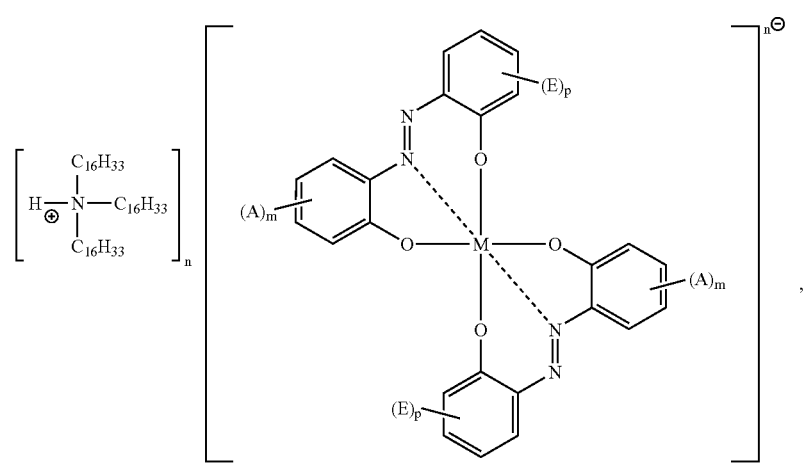
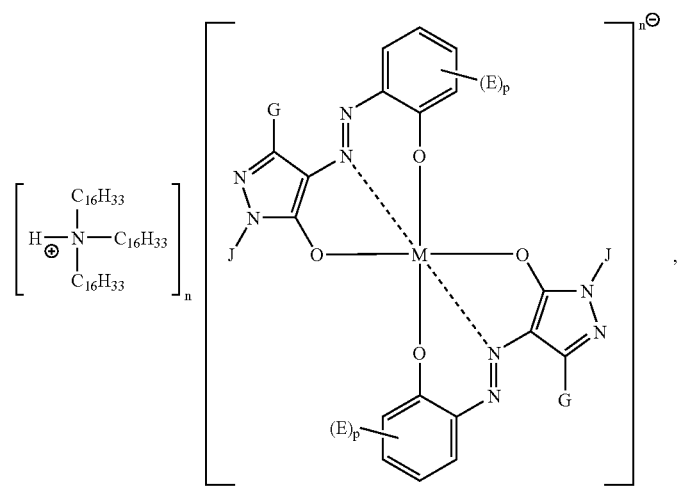

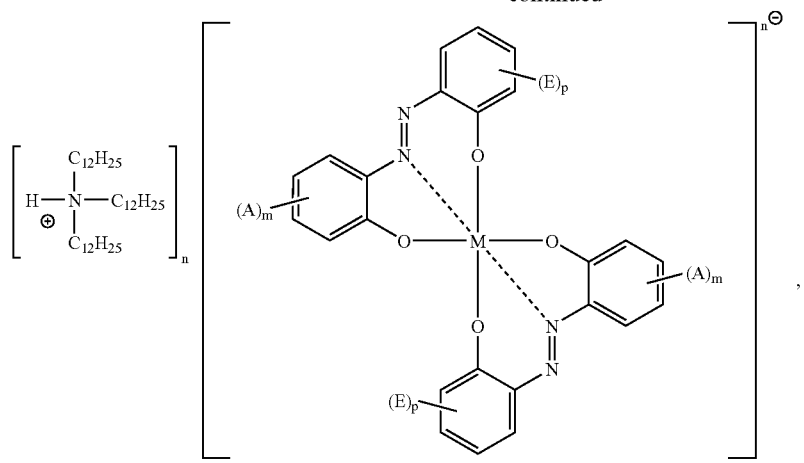

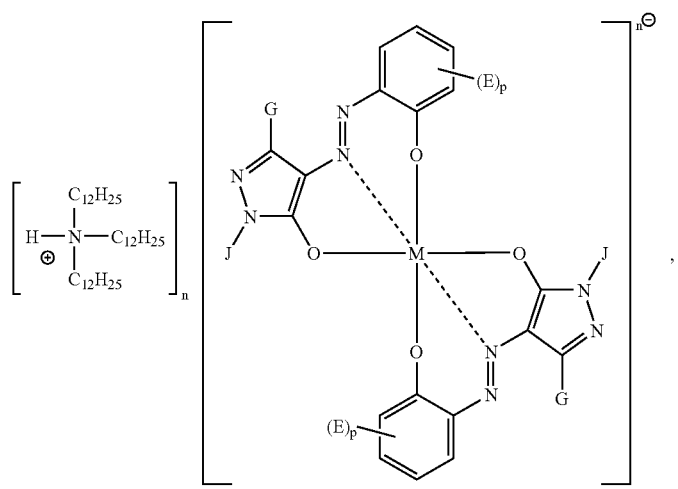

or mixtures thereof.

45. An ink according to claim 1 wherein the colorant is present in the ink in an amount of at least about 0.1 percent by weight of the ink.

46. An ink according to claim 1 wherein the colorant is present in the ink in an amount of no more than about 20 percent by weight of the ink.

47. An ink according to claim 1 further containing Disperse Orange 47.

48. An ink according to claim 47 wherein the Disperse Orange 47 is present in an amount of at least about 0.01 part by weight Disperse Orange 47 per every one part by weight colorant of the formula

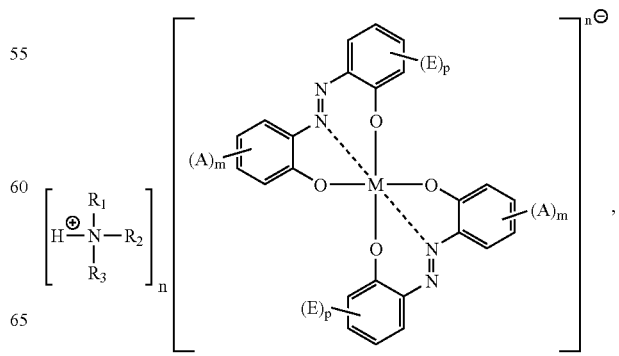

-continued

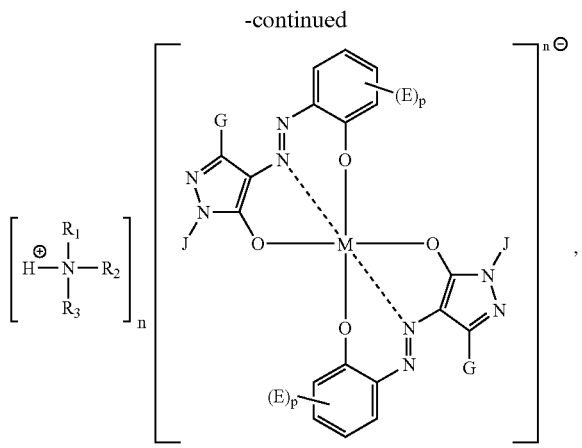

or mixtures thereof.

49. An ink according to claim 47 wherein the Disperse Orange 47 is present in an amount of no more than about 1 part by weight Disperse Orange 47 per every one part by weight colorant of the formula

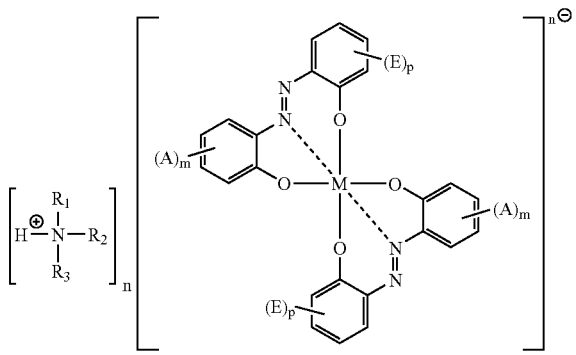

,

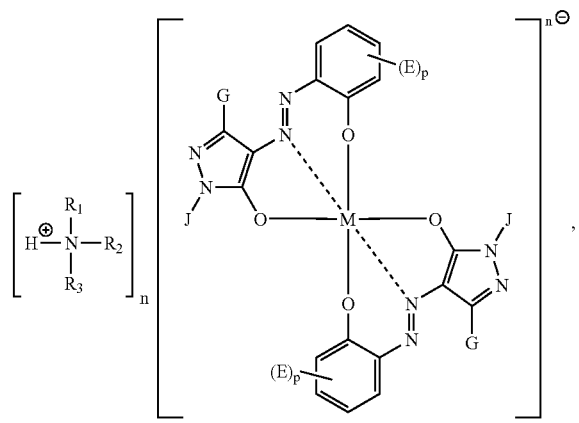

or mixtures thereof.

50. An ink according to claim 1 wherein the phase change ink carrier comprises a monoamide, a tetra-amide, or a mixture thereof.

51. An ink according to claim 1 wherein the phase change ink carrier comprises (a) stearyl stearamide, (b) a dimer acid based tetra-amide that is the reaction product of dimer acid, ethylene diamine, and stearic acid, or (c) mixtures thereof.

52. An ink according to claim 1 wherein the phase change ink carrier comprises (a) stearyl stearamide, (b) a dimer acid based tetra-amide that is the reaction product of dimer acid, ethylene diamine, and a carboxylic acid having at least about 36 carbon atoms, or (c) mixtures thereof.

53. An ink according to claim 1 wherein the phase change ink carrier comprises an isocyanate-derived material.

54. An ink according to claim 1 wherein the phase change ink carrier comprises a urethane isocyanate-derived material, a urea isocyanate-derived material, a urethane/urea isocyanate-derived material, or mixtures thereof.

55. An ink according to claim 1 wherein the phase change ink carrier comprises a mixture of one or more amides and one or more isocyanate-derived materials.

56. An ink according to claim 1 wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

57. An ink according to claim 1 wherein the ink carrier comprises (a) a polyethylene wax, (b) a stearyl stearamide wax, (c) a dimer acid based tetra-amide that is the reaction product of dimer acid, ethylene diamine, and a carboxylic acid having at least about 36 carbon atoms, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol, and (f) an antioxidant.

58. An ink according to claim 1 wherein the ink carrier comprises (a) a polyethylene wax in an amount of at least about 25 percent by weight of the ink and in an amount of no more than about 60 percent by weight of the ink, (b) a stearyl stearamide wax in an amount of at least about 8 percent by weight of the ink and in an amount of no more than about 32 percent by weight of the ink, (c) a dimer acid based tetra-amide that is the reaction product of dimer acid, ethylene diamine, and a carboxylic acid having at least about 36 carbon atoms in an amount of at least about 10 percent by weight of the ink and in an amount of no more than about 32 percent by weight of the ink, (d) a urethane resin derived from the reaction of two equivalents of hydroabietyl alcohol and one equivalent of isophorone diisocyanate in an amount of at least about 6 percent by weight of the ink and in an amount of no more than about 16 percent by weight of the ink, (e) a urethane resin that is the adduct of three equivalents of stearyl isocyanate and a glycerol-based alcohol in an amount of at least about 2 percent by weight of the ink and in an amount of no more than about 13 percent by weight of the ink, and (f) an antioxidant in an amount of at least about 0.01 percent by weight of the ink and in an amount of no more than about 1 percent by weight of the ink.

59. A process which comprises (1) incorporating into an ink jet printing apparatus a phase change ink comprising a phase change ink carrier and a colorant compound of the formula

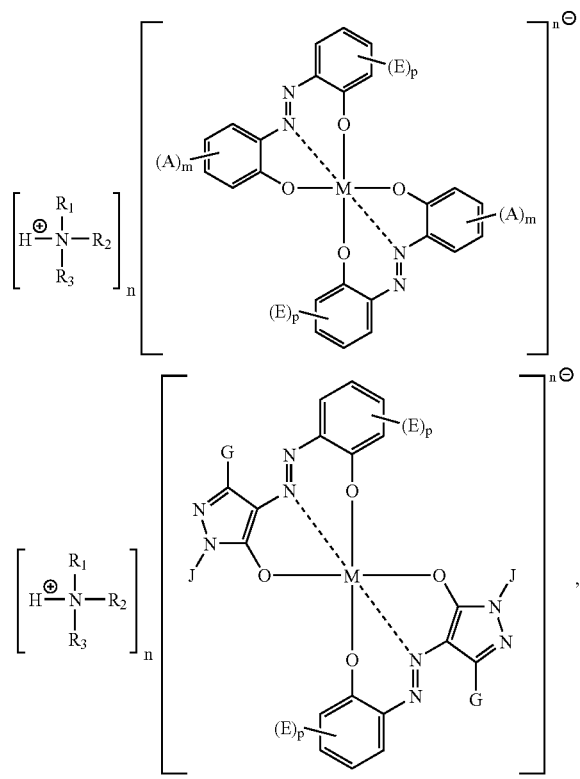

or mixtures thereof, wherein $R_1$, $R_2$, and $R_3$ each, independently of the others, is a hydrogen atom, an alkyl group, including linear and branched, saturated and unsaturated, cyclic and acyclic, and substituted and unsubstituted alkyl groups, and wherein hetero atoms either may or may not be present in the alkyl group, an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group, provided that the total number of carbon atoms and hetero atoms, excluding atoms in any substituents, in $R_1+R_2+R_3$ is at least about 18, M is a metal atom, each A, each E, and each G, independently of the other, represents a substituent on a phenyl or pyrazolone ring, wherein G can also be a hydrogen atom, m is an integer of 0, 1, or 2, p is an integer of 0, 1, 2, 3, or 4, J represents (i) a hydrogen atom, (ii) an alkyl group (including linear and branched, saturated and unsaturated, cyclic and acyclic, and substituted and unsubstituted alkyl groups, and wherein hetero atoms either may or may not be present in the alkyl group), (iii) an aryl group (including substituted and unsubstituted aryl groups, and wherein hetero atoms either may or may not be present in the aryl group), (iv) an arylalkyl group (including substituted and unsubstituted arylalkyl groups, wherein the alkyl portion of the arylalkyl group can be linear or branched, saturated or unsaturated, and cyclic or acyclic, and wherein hetero atoms either may or may not be present in either the aryl or the alkyl portion of the arylalkyl group), or (v) an alkylaryl group (including substituted and unsubstituted alkylaryl groups, wherein the alkyl portion of the alkylaryl group can be linear or branched, saturated or unsaturated, and cyclic or acyclic, and wherein hetero atoms either may or may not be present in either the aryl or the alkyl portion of the alkylaryl group), wherein two or more substituents on the phenyl or pyrazolone rings can be joined together to form a ring, and n represents an integer of 1, 2, or 3; (2) melting the ink; and (3) causing droplets of the melted ink to be ejected in an imagewise pattern onto a substrate.

60. A process according to claim 59 wherein the printing apparatus employs a piezoelectric printing process wherein droplets of the ink are caused to be ejected in imagewise pattern by oscillations of piezoelectric vibrating elements.

61. A process according to claim 59 wherein the substrate is a final recording sheet and droplets of the melted ink are ejected in an imagewise pattern directly onto the final recording sheet.

62. A process according to claim 59 wherein the substrate is an intermediate transfer member and droplets of the melted ink are ejected in an imagewise pattern onto the intermediate transfer member followed by transfer of the imagewise pattern from the intermediate transfer member to a final recording sheet.

63. A process according to claim 62 wherein the intermediate transfer member is heated to a temperature above that of the final recording sheet and below that of the melted ink in the printing apparatus.

64. A process according to claim 62 wherein both the intermediate transfer member and the final recording sheet are heated to a temperature below that of the melted ink in the printing apparatus, and wherein the final recording sheet is heated to a temperature above that of the intermediate transfer member and below that of the melted ink in the printing apparatus.

65. A process according to claim 62 wherein both the intermediate transfer member and the final recording sheet are heated to a temperature below that of the melted ink in the printing apparatus, and wherein the intermediate transfer member is heated to a temperature above that of the final recording sheet and below that of the melted ink in the printing apparatus.

* * * * *